US011200237B2

(12) United States Patent
Lim et al.

(10) Patent No.: US 11,200,237 B2
(45) Date of Patent: Dec. 14, 2021

(54) ADVANCED FORMULAS PLANNING SCRIPT CONVERSION PLATFORM

(71) Applicant: SAP SE, Walldorf (DE)

(72) Inventors: Yong-Tae Lim, Gangbuk-gu (KR); Seok taek Lim, Seoul (KR); Hongchul Kim, Dongjak-gu (KR); Sang Mook Choi, Dongjak-gu (KR); Jungsoo Seo, Seocho-gu (KR)

(73) Assignee: SAP SE, Walldorf (DE)

( * ) Notice: Subject to any disclaimer, the term of this patent is extended or adjusted under 35 U.S.C. 154(b) by 104 days.

(21) Appl. No.: 16/058,152

(22) Filed: Aug. 8, 2018

(65) Prior Publication Data

US 2019/0392069 A1 Dec. 26, 2019

Related U.S. Application Data

(60) Provisional application No. 62/687,422, filed on Jun. 20, 2018.

(51) Int. Cl.
G06F 17/00 (2019.01)
G06F 16/2455 (2019.01)
G06F 16/242 (2019.01)
G06F 16/248 (2019.01)

(52) U.S. Cl.
CPC ...... *G06F 16/24553* (2019.01); *G06F 16/242* (2019.01); *G06F 16/248* (2019.01)

(58) Field of Classification Search
CPC ............. G06F 16/24553; G06F 16/248; G06F 16/242; G06F 16/2455
See application file for complete search history.

(56) References Cited

U.S. PATENT DOCUMENTS 10,298,702 B2 * 5/2019 Park ................... G06F 16/2455
2005/0262472 A1 * 11/2005 Wood .................. G06Q 10/06
717/102
2007/0118516 A1 * 5/2007 Li ..................... G06F 16/24528
(Continued)

OTHER PUBLICATIONS

Bernhard Fiser et al., On-Line Analytical Processing on Large Databases Managed by Computational Grids, Proceedings of the 15th International Workshop on Database and Expert Systems Applications (DEXA' 04), IEEE Compuer Society, 5 pages, Sep. 20 (Year: 2004).*

*Primary Examiner* — Greta L Robinson
(74) *Attorney, Agent, or Firm* — Buckley, Maschoff & Talwalkar LLC

(57) ABSTRACT

Some embodiments are associated with an analytics cloud environment. A user interface may facilitate generation of an advanced formulas planning script by a user. The advanced formulas planning script may be stored, for example, in a planning script data store. An analytic data cube may contain a multidimensional dataset usable for analysis via queries. A conversion platform may receive the advanced formulas planning script and automatically create a structured query language stored procedure based on the advanced formulas planning script. The conversion platform may then execute the structured query language stored procedure on the analytic data cube to calculate a result comprising a base cell and at least one cell has a different point of view associated with the analytic data cube as compared to a calculation source. The calculated result man then be provided to the user.

19 Claims, 24 Drawing Sheets

(56) References Cited

U.S. PATENT DOCUMENTS

| | | | |
|---|---|---|---|
| 2007/0203933 A1* | 8/2007 | Iversen | G06F 16/283 |
| 2012/0173589 A1* | 7/2012 | Kwon | G06F 16/2282 |
| | | | 707/803 |
| 2019/0065972 A1* | 2/2019 | Rais-Ghasem | G06F 16/248 |
| 2019/0205726 A1* | 7/2019 | Khabiri | G06F 16/243 |

* cited by examiner

| ACCOUNT | PLANT | AUDIT | PRODUCT | TIME | SIGNEDDATA |
|---|---|---|---|---|---|
| PRICE | # | Manual | 16GB | 201801 | 100 |
| PRICE | # | Manual | 32GB | 201801 | 200 |
| PRICE | # | Adjustment | 16GB | 201801 | 150 |
| | | | | | |

400

| ACCOUNT | PLANT | AUDIT | PRODUCT | TIME | SIGNEDDATA |
|---|---|---|---|---|---|
| QUANTITY | PLT01 | Manual | 16GB | 201801 | 1000 |
| QUANTITY | PLT01 | Manual | 32GB | 201801 | 4000 |
| QUANTITY | PLT01 | Adjustment | 16GB | 201801 | 2000 |
| QUANTITY | PLT01 | None | 32GB | 201801 | 3000 |

FIG. 4

| ACCOUNT | PLANT | AUDIT | PRODUCT | TIME | SIGNEDDATA | ACCOUNT | PLANT | AUDIT | PRODUCT | TIME | SIGNEDDATA |
|---|---|---|---|---|---|---|---|---|---|---|---|
| PRICE | PLT01 | None | 16GB | 201801 | 100 | QUANTITY | PLT01 | None | 16GB | 201801 | 5000 |
| PRICE | PLT01 | None | 32GB | 201801 | 200 | QUANTITY | PLT01 | None | 32GB | 201801 | 3000 |

| ACCOUNT | PLANT | AUDIT | PRODUCT | TIME | SIGNEDDATA |
|---|---|---|---|---|---|
| PRICE | # | None | 16GB | 201801 | 100 |
| PRICE | # | None | 32GB | 201801 | 200 |
|  |  |  |  |  |  |
|  |  |  |  |  |  |

| ACCOUNT | PLANT | AUDIT | PRODUCT | TIME | SIGNEDDATA |
|---|---|---|---|---|---|
| QUANTITY | PLT01 | Manual | 16GB | 201801 | 1000 |
| QUANTITY | PLT01 | Manual | 32GB | 201801 | 4000 |
| QUANTITY | PLT02 | Adjustment | 16GB | 201801 | 2000 |
| QUANTITY | PLT03 | Manual | 32GB | 201801 | 3000 |

FIG. 6

| ACCOUNT | PLANT | AUDIT | PRODUCT | TIME | SIGNEDDATA |
|---------|-------|-------|---------|--------|------------|
| PRICE | # | None | 16GB | 201801 | 100 |
| PRICE | # | None | 32GB | 201801 | 200 |
| PRICE | # | None | 16GB | 201801 | 100 |
| PRICE | # | None | 32GB | 201801 | 200 |

| ACCOUNT | PLANT | AUDIT | PRODUCT | TIME | SIGNEDDATA |
|----------|-------|------------|---------|--------|------------|
| QUANTITY | PLT01 | Manual | 16GB | 201801 | 1000 |
| QUANTITY | PLT01 | Manual | 32GB | 201801 | 4000 |
| QUANTITY | PLT02 | Adjustment | 16GB | 201801 | 2000 |
| QUANTITY | PLT03 | Manual | 32GB | 201801 | 3000 |

FIG. 7

| ACCOUNT | PLANT | AUDIT | PRODUCT | TIME | SIGNEDDATA | ACCOUNT | PLANT | AUDIT | PRODUCT | TIME | SIGNEDDATA |
|---|---|---|---|---|---|---|---|---|---|---|---|
| | PLT01 | Manual | 16GB | 201801 | 100000 | LOSS_RATE | PLT01 | None | # | 201801 | 0.1 |
| | PLT01 | Manual | 32GB | 201801 | 800000 | LOSS_RATE | PLT01 | None | # | 201801 | 0.1 |
| | PLT02 | Adjustment | 16GB | 201801 | 200000 | LOSS_RATE | PLT02 | None | # | 201801 | 0.2 |
| | PLT03 | Manual | 32GB | 201801 | 600000 | | | | | | |

800

| ACCOUNT | PLANT | AUDIT | PRODUCT | TIME | PRICE | QUANTITY |
|---|---|---|---|---|---|---|
| | PLT01 | Manual | 16GB | 201801 | 100 | 1000 |
| | PLT01 | Manual | 32GB | 201801 | 200 | 4000 |
| | PLT01 | Adjustment | 16GB | 201801 | 150 | 1000 |
| | PLT02 | Manual | 16GB | 200801 | 100 | 2000 |
| | PLT02 | Manual | 32GB | 201801 | 200 | |
| | PLT02 | Adjustment | 16GB | 201801 | 150 | 2000 |
| | PLT03 | Manual | 16GB | 201801 | 100 | |
| | PLT03 | Manual | 32GB | 201801 | 200 | 3000 |
| | PLT03 | Adjustment | 16GB | 201801 | 150 | |
| | PLT01 | Adjustment | 32GB | 201801 | | 4000 |
| | PLT03 | Adjustment | 32GB | 201801 | | 3000 |

CALCULATED BY
SCRIPT LOGIC

|  | 2018 | Q1 2018 | JAN 2018 | FEB 2018 | MAR 2018 |
|---|---|---|---|---|---|
| ALL FLOWS |  | 100 | 100 | 100 | 100 |
| UNASSIGNED |  |  |  |  |  |
| OPENING FLOW |  |  | 60 | 100 | 100 |
| DELTA FLOW |  |  | 40 |  |  |
| NO FLOW |  |  |  |  |  |
| CLOSING FLOW |  |  |  |  |  |
| TEMPORARY FLOW |  |  | 100 | 100 | 100 |

LOAD ENDING
BALANCE VALUE

FIG. 12

| ACCOUNT | PLANT | AUDIT | PRODUCT | TIME | Previous(12) | SIGNEDDATA | ACCOUNT | PLANT | AUDIT | PRODUCT | TIME | Previous(24) | SIGNEDDATA |
|---|---|---|---|---|---|---|---|---|---|---|---|---|---|
| PRICE | # | Manual | 16GB | 201802 | 201702 | 100 | PRICE | # | Manual | 16GB | 201801 | 201601 | 300 |
| PRICE | # | Manual | 32GB | 201801 | 201701 | 200 | PRICE | # | Manual | 32GB | 201802 | 201602 | 100 |
| SALES | # | Manual | 16GB | 201803 | 201703 | 300 | SALES | # | Manual | 16GB | 201803 | 201603 | 400 |
| COST | PLT01 | Manual | 16GB | 201801 | 201701 | 200 | COST | PLT01 | Manual | 16GB | 201801 | 201601 | 200 |
| COST | PLT02 | Manual | 32GB | 201803 | 201703 | 1000 | COST | PLT02 | Manual | 32GB | 201803 | 201603 | 150 |
| SALES | # | Manual | 64GB | 201801 | 201701 | 200 | SALES | # | Manual | 64GB | 201801 | 201601 | 250 |
| SALES | # | Manual | 16GB | 201803 | 201703 | 150 | SALES | PLT02 | Manual | 16GB | 201803 | 201603 | 200 |
| SALES | # | Manual | 32GB | 201802 | 201702 | 400 | SALES | # | Manual | 32GB | 201802 | 201602 | 300 |
| ... | ... | ... | ... | ... | ... | ... | ... | ... | ... | ... | ... | ... | ... |
| ... | ... | ... | ... | ... | ... | ... | ... | ... | ... | ... | ... | ... | ... |

| ACCOUNT | PLANT | ACCOUNT of AUDIT | AUDIT | PRODUCT | TIME | SIGNEDDATA | ACCOUNT | PLANT | AUDIT | PRODUCT | TIME | SIGNEDDATA |
|---|---|---|---|---|---|---|---|---|---|---|---|---|
| OPERATOR | # | Depreciation | PLUS | # | 201801 | 1 | Depreciation | PLT01 | Manual | # | 201801 | 3000 |
| OPERATOR | # | Depreciation | PLUS | # | 201801 | 1 | Depreciation | PLT02 | Manual | # | 201801 | 2000 |
| OPERATOR | # | Account_Receivables | MINUS | # | 201801 | -1 | Account_Receivables | PLT01 | PLUS | 16GB | 201801 | 5000 |
| OPERATOR | # | Account_Receivables | MINUS | # | 201801 | -1 | Account_Receivables | PLT02 | MINUS | 32GB | 201801 | 6000 |
| OPERATOR | # | Account_Payable | PLUS | # | 201801 | 1 | Account_Payable | PLT01 | PLUS | 16GB | 201801 | 3000 |

ADVANCED FORMULAS PLANNING SCRIPT CONVERSION PLATFORM

CROSS-REFERENCE TO RELATED APPLICATION

The present application claims the benefit of U.S. Provisional Patent Application No. 62/687,422 entitled "ADVANCED FORMULAS PLANNING SCRIPT CONVERSION PLATFORM" and filed Jun. 20, 2018. The entire content of that application is incorporated herein by reference.

FIELD

Some embodiments are associated with ways to access information in databases. In particular, some embodiments provide an advanced formulas planning script conversion platform.

BACKGROUND

In some cases, a user might want to retrieve business information about an enterprise from a database. For example, a user might want to create a query to view and/or analyze information from an enterprise data store about the enterprise's revenue or profit in accordance with various regions, time periods, products, etc. Query languages, such as the Structured Query Language ("SQL"), may be particularly suited for retrieval of data from data stores, regardless of the schema of the data. A user may author a data manipulation as a high-level definition of a complex request on a database (e.g., an artifact or manipulation that may be frequently re-used). The data manipulation may be associated with a particular database connectivity technology (e.g., Open Database Connectivity ("ODBC") or Java Database Connectivity ("JDBC")) that will later be translated on-the-fly into SQL. Note, however, that such an approach does not provide a user-friendly script that can generate high performance procedures that can also cover complicated business logic. Moreover, knowledge of SQL, Multi-Dimensional Expressions ("MDX"), Multi-Dimensional Scaling ("MDS") maybe required to properly extract information from the data store (and many users might not have such knowledge).

It may therefore be desirable to provide systems and methods to facilitate cloud analytics data retrieval in an automated and flexible manner.

SUMMARY OF THE INVENTION

According to some embodiments, systems, methods, apparatus, computer program code and means are provided to facilitate cloud analytics data retrieval in an automated and flexible manner. Some embodiments are associated with an analytics cloud environment. A user interface may facilitate generation of an advanced formulas planning script by a user. The advanced formulas planning script may be stored, for example, in a planning script data store. An analytic data cube may contain a multidimensional dataset usable for analysis via queries. A conversion platform may receive the advanced formulas planning script and automatically create a structured query language stored procedure based on the advanced formulas planning script. The conversion platform may then execute the structured query language stored procedure on the analytic data cube to calculate a result comprising a base cell and at least one cell has a different point of view associated with the analytic data cube as compared to a calculation source. The calculated result man then be provided to the user.

Some embodiments comprise: means for facilitating, via a user interface, generation of an advanced formulas planning script by a user; means for storing the advanced formulas planning script in a planning script data store; means for retrieving, by a conversion platform, the advanced formulas planning script; from the planning script data store; means for automatically creating, by the conversion platform, a structured query language stored procedure based on the advanced formulas planning script; means for executing the structured query language stored procedure on an analytic data cube, containing a multidimensional dataset usable for analysis via queries, to calculate a result comprising a base cell and at least one cell has a different point of view associated with the analytic data cube as compared to a calculation source; and means for arranging to provide the calculated result to the user.

In some embodiments, a communication device associated with a back-end application computer server exchanges information with remote user devices (e.g., to author and/or use data manipulations). The information may be exchanged, for example, via public and/or proprietary communication networks.

Technical effects of some embodiments of the invention are improved and computerized ways to facilitate cloud analytics data retrieval in an automated and flexible manner. With these and other advantages and features that will become hereinafter apparent, a more complete understanding of the nature of the invention can be obtained by referring to the following detailed description and to the drawings appended hereto.

BRIEF DESCRIPTION OF THE DRAWINGS

FIG. 4 is a table illustrating a script calculating "Revenue" for 3 plants in accordance with some embodiments.

FIGS. 5 through 7 illustrate an advanced scenario according to some embodiments.

FIGS. 8 through 11 illustrate result lookups in accordance with some embodiments.

FIGS. 12 and 13 illustrate a loop instruction according to some embodiments.

FIGS. 16 through 18 illustrate a time function calculation according to some embodiments.

FIGS. 19 and 20 illustrate an attribute example in accordance with some embodiments.

DETAILED DESCRIPTION

The following description is provided to enable any person in the art to make and use the described embodiments and sets forth the best mode contemplated for carrying out some embodiments. Various modifications, however, will remain readily apparent to those in the art.

Figure 1:
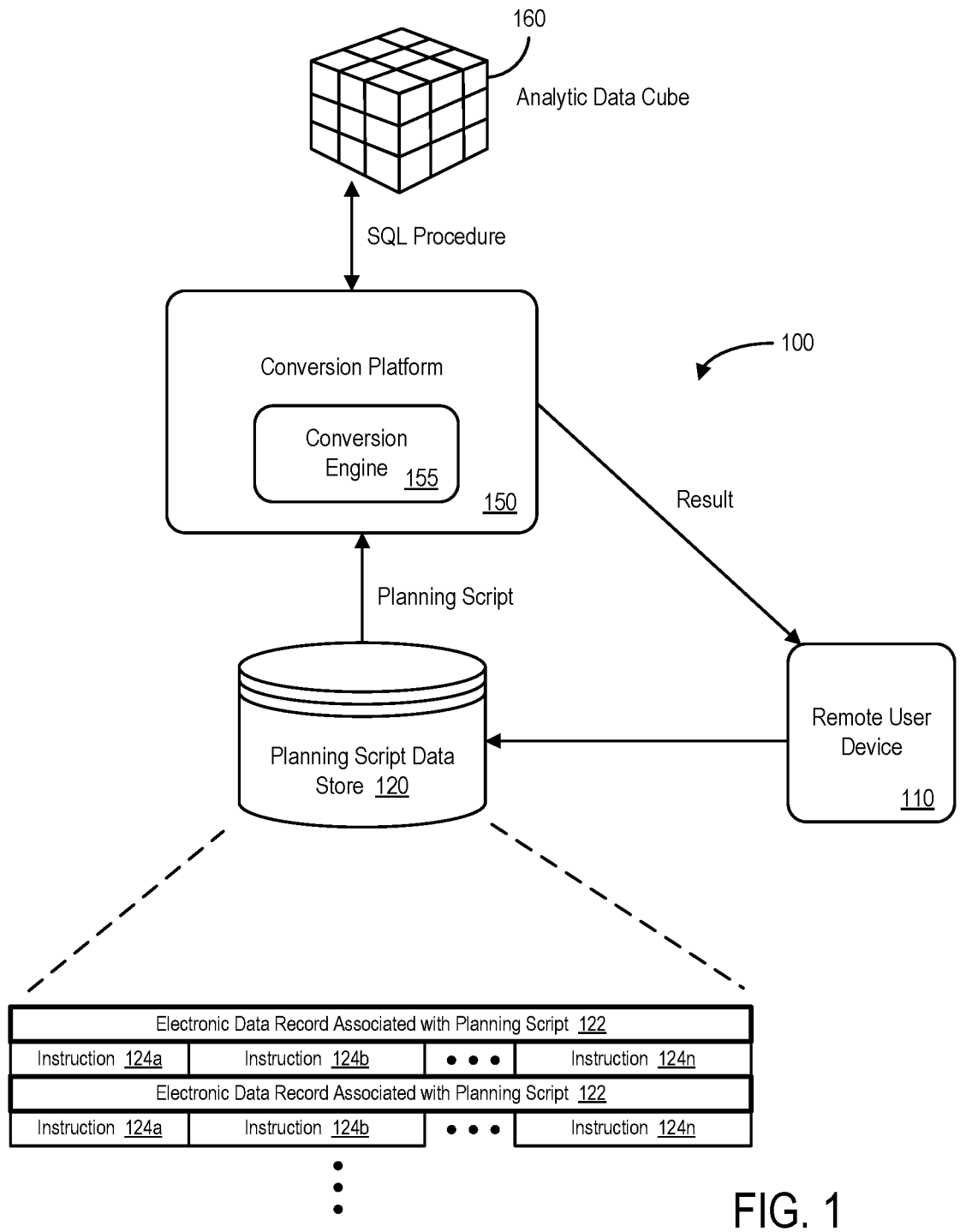
FIG. 1 is a block diagram of a system according to some embodiments.

FIG. 1 is block diagram of a system 100 according to some embodiments of the present invention. In particular, the system 100 includes a user device 110 that may be used, for example, to enter advanced formulas planning script instructions (e.g., via a user interface). The planning script may then be stored into a planning script data store 120 (e.g., containing electronic records 122 of the instructions 124a, 124b, . . . 124n). A conversion platform 150 and/or conversion engine 155 may then access the planning script from the data store 120. The conversion engine 155 might, for example, automatically translate the planning script into appropriate SQL procedures that can be executed on an analytic data cube 160 to generate a result. The calculated result may then be provided to the user (e.g., the author of the planning script). The conversion platform 150 might be, for example, associated with a Personal Computers ("PC"), laptop computer, an enterprise server, a server farm, and/or a database or similar storage devices.

As used herein, devices, including those associated with the conversion platform 150 and any other device described herein, may exchange information via any communication network which may be one or more of a telephone network, a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

According to some embodiments, an "automated" conversion platform 150 may translate the planning script into an SQL procedure. As used herein, the term "automated" may refer to, for example, actions that can be performed with little or no human intervention.

The conversion platform 150 may store information into and/or retrieve information from the data store 120. The data store 120 may be a locally stored relational database or reside remote from the conversion platform 150. The term "relational" may refer to, for example, a collection of data items organized as a set of formally described tables from which data can be accessed. Moreover, a Relational Database Management System ("RDBMS") may be used in connection with any of the database tables described herein. According to some embodiments, a graphical administrator interface may provide an ability to access and/or modify elements of the system. The administrator interface might, for example, let an administrator map users to cubes, generate reports, etc.

Although a single conversion platform 150 is shown in FIG. 1, any number of such devices may be included. Moreover, various devices described herein might be combined according to embodiments of the present invention. For example, in some embodiments, the conversion platform 150 and user device 110 might be co-located and/or may comprise a single apparatus.

Figure 2:
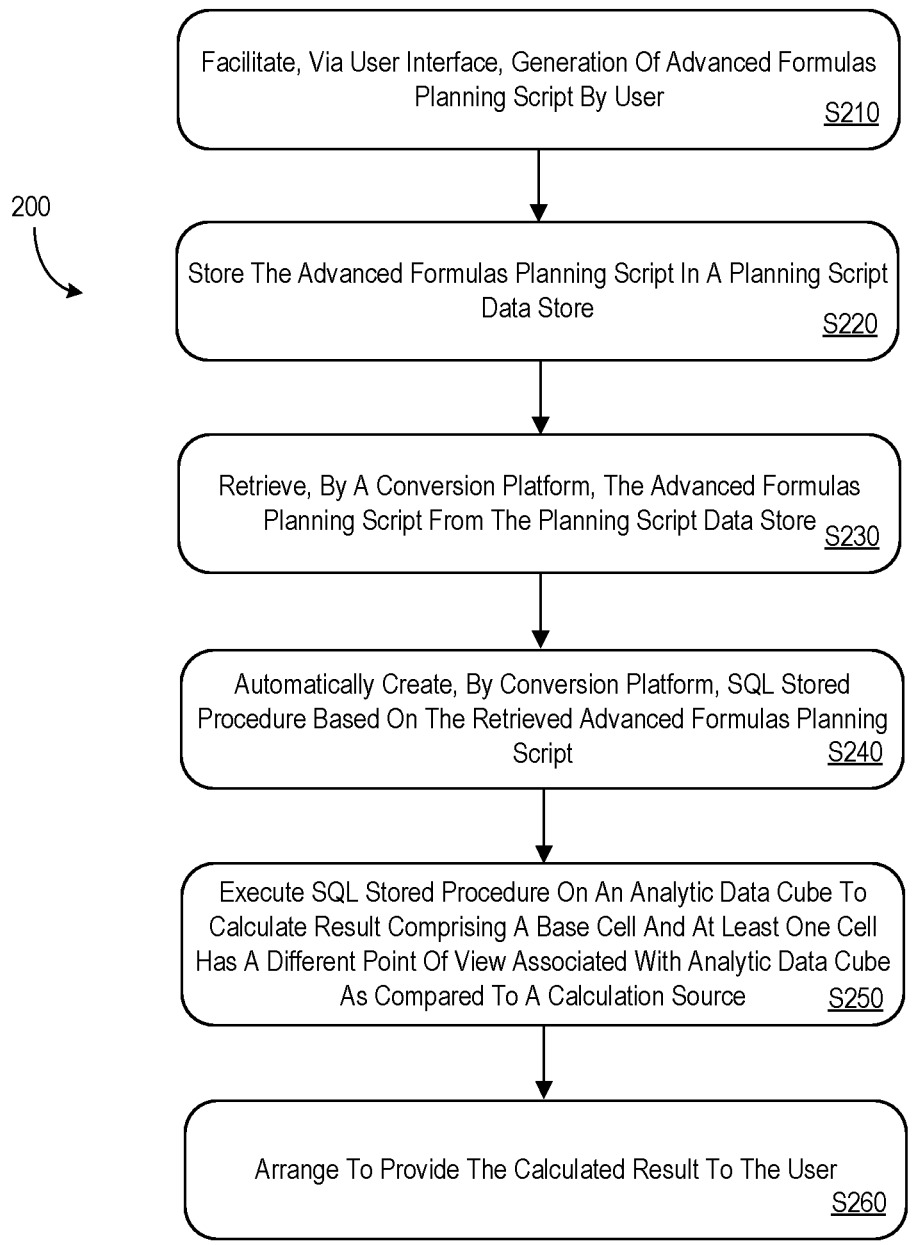
FIG. 2 illustrates method in accordance with some embodiments.

FIG. 2 illustrates a method 200 that might be performed by some or all of the elements of the system 100 described with respect to FIG. 1, or any other system, according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S210, a user interface may facilitate generation of an advanced formulas planning script by a user. The advanced formulas planning script may then be stored a planning script data store at S220. At S230, a conversion platform may retrieve the advanced formulas planning script from the planning script data store and automatically create a structured query language stored procedure based on the advanced formulas planning script at S240. The conversion platform may, at S250, execute the structured query language stored procedure on an analytic data cube, containing a multidimensional dataset usable for analysis via queries, to calculate a result comprising a base cell and at least one cell has a different point of view associated with the analytic data cube as compared to a calculation source. The system may then arrange to provide the calculated result to the user at S260.

As a result, an advanced formulas planning script may be implemented for administrators who understand an analytic cube and associated planning. The script is may be n analytic cloud specific language, and knowledge of SQL, MDX even MDS may not be required.

There are several methods for calculation for an analytic cloud, such as account formula and calculation node. But there are some limitations on existing calculation methods in flexibility (e.g., balance sheet and cash flow calculations). To have more flexibility on the calculation a planning script may store a calculated result at the storage of a model which is an analytic cube. As a result, calculated results of the planning script may be base cells. This may enable cells to have different Points Of View ("POV") as compared to a calculation source. For example, currency translation adjustment may require an adjusted value that should be differentiated with different POV (to be distinguished from the original translated values). Another example is the carry-forward to initiate OPENING value with CLOSING of last period sequentially.

The syntax of the account member formula may be optimized for the usage of account member calculation, and the most of syntax is for the function based while planning script requires the procedural functionality. Note that advanced formulas may perform calculations with base level of cells only (which don't have any MDS calculation such as account formula or parent member). Because all calculations are processed in a database layer with SQL script, if a user wants to use aggregated values in the script, he or she may copy scattered values regardless of hierarchy into a cell value with same POV. Note that an account formula member and parent member cannot be used because of the engine limitation. If a user defines a calculation with formula/parent member, the planning script cannot be aware of the value because it is not in model storage.

Basically, advanced formulas have of three parts. One is a scope definition. Second is a condition to apply various calculation with various condition. Third is calculation and calculated data generation.

With respect to scope, scope if a user doesn't want to perform planning script against an entire model, there may be a way to handle scope of a model before calculation. For example, the calculation logic of a script is only for ASIA region because of a law, user can re-define the scope of calculation in a model in the script not to calculate values of EUROPE countries. There may be two scopes involved in calculations. The first is source, and the second is target. For example:

```
Data([d/TIME]="201801", [d/CATEGORY]="Plan") = ResultLookup([d/TIME]="201701",
[d/CATEGORY]="Actual") * 1.05
Data([d/ACCOUNT]="Revenue") = ResultLookup([d/ACCOUNT]="Price", [d/PLANT]=="#") *
ResultLookup([d/ACCOUNT]="Quantity")
```

To the left of the equal operator is the "target scope" which will have calculated result. To the right of the equal operator is the "source scope" which will be used in the calculation. The script allows a user to define scope in it not to do unexpected calculation. If a user wants to do calculation (Copy 2017 January Sales number into 2018 January Sales plan with 5% increase), the user may define the scope as follows:

```
MEMBERSET [d/ACCOUNT]="Sales"
MEMBERSET [d/TIME]="201801"
Data([d/CATEGORY]="Plan") = ResultLookup([d/TIME]=Previous(12),
[d/CATEGORY]="Actual") * 1.05
```

Subsequently, the data action will introduce a POV parameter for runtime to define the calculation scope. From a user perspective, the user will expect calculation with a report which contains target scope not source. It is more intuitive to have target scope as a basis. For example, it is improper to launch balance sheet calculation with Profit and Loss ("P&L") accounts because P&L accounts are source of calculation. And the user may usually want to trigger balance sheet calculation on the report with balance sheet accounts.

After definition of calculation scope, there could be conditions to apply different calculation in a planning script. For example, in case some P&L account members which are about balance sheet calculation, there should be a condition to filter out not balance sheet calculation related account members:

```
IF [d/ACCOUNT].[p/BS_CALC]="YES" THEN
Data([d/ACCOUNT]=[d/ACCOUNT].[p/BSACCOUNT], [d/FLOW]="BSCALC") =
ResultLookup( )
ENDIF
IF [d/ORG].[p/REGION] = "ASIA" THEN
Data([d/ACCOUNT]="Revenue", [d/CATEGORY]="Plan") =
ResultLookup([d/ACCOUNT]="Revenue", [d/TIME]=PREVIOUS(1)) * 1.10
ELSEIF [d/ORG].[p/REGION] = "EUROPE" THEN
Data([d/ACCOUNT]="Revenue", [d/CATEGORY]="Plan") =
ResultLookup([d/ACCOUNT]="Revenue", [d/TIME]=PREVIOUS(l)) * 1.05
ENDIF
```

The ResultLookup may have similar parameters with MDS ResultLookup. And its behavior may also be similar. Note, however, that ResultLookup in planning script might not support calculated values (this is an important difference a user should be aware of).

The right side of the equal operator may return key figure value at the end. And the left side of the equal operator with "data" may create new records based on the key figure value right side returned. The newly generated records may follow up the POV of right side and can be overwritten in the data by the script.

At the end of the script step, all calculated results of a planning script may be inserted into the internal storage like other planning steps. All generated values will be transferred to next planning step via the internal storage. This means that all planning steps in a data action works on the data that previous planning steps generated/calculated. When all planning steps in a data action are completed, all newly created/calculated values will be written at once into the model.

The planning script might be useful, for example, when a user:

seeds to materialize calculated values in the storage (not on the fly);
needs more flexibility like set POV differently after calculation;
needs ordered calculation sequentially time wise (calculated result of previous period would be used in the following period);
needs more flexible and efficiency in model; or
needs different calculations in a shared account dimension between different models.

According to some embodiments, the planning script is a planning step which is a part of the data action (and not an independent object which a user can execute separately). A data action will include multiple planning steps with various type such as "Copy", "Delete," etc. All planning steps will work on the Plan Data Container ("PDC"). To support efficient and intuitive undo/redo, all planning steps may write values at the PDC at the end of the data action not end of each planning step. Then, the planning script should be aware of the PDC data and newly generated data from previous planning steps in a current data action. Generated records from planning steps will not be in the PDC yet (until reach out the end of data action).

Because a planning script is not an independent object, there is no way to handle it separately from a data action which contains it (that is, no way to reuse). Moreover, no independent lifecycle or separate security required.

Technically, there are four functions in a planning script:
Scope & condition: both definitions are for handling range of calculation;
ResultLookup: gathering source value(s) to be used in a calculation or condition;
Mathematical calculation: Return calculated key figure by ResultLookup(s) and numeric value(s) which is(are) located in right side of equal operator; and
Data generation: Manipulate POV with the results of mathematical calculation.

The planning script may load data from the PDC as late as possible. Functions like MEMBERSET or FOREACH that don't require data may work with only master data. Note that the scope may be treated with dice or slice level for calculations at the end. As a result, a planning script won't care cell level details which cannot be expressed with member list easily (because it requires complexity in the engine and user expectation). Some examples will now be provided.

For example, there may be an analytic cloud model the consists of five dimensions (ACCOUNT, PLANT, PRODUCT, AUDIT, TIME). The master data is illustrated in Tables 1 and 2.

TABLE 1

| ACCOUNT |
| --- |
| PRICE |
| QUANTITY |

TABLE 1-continued

| ACCOUNT |
| --- |
| REVENUE |
| TAX |
| SALES |
| EXTSALES |
| INTERESTING |

TABLE 2

| PRODUCT |
| --- |
| 16 GB |
| 32 GB |
| 64 GB |

```
IF [d/PRODUCT] =("16GB","32GB") AND [d/AUDIT] ="MANUAL" THEN // It is obvious dice shape.
<Calculation...>
ELSE           // How about this?
<Calculation...>
ENDIF
```

Figure 3:
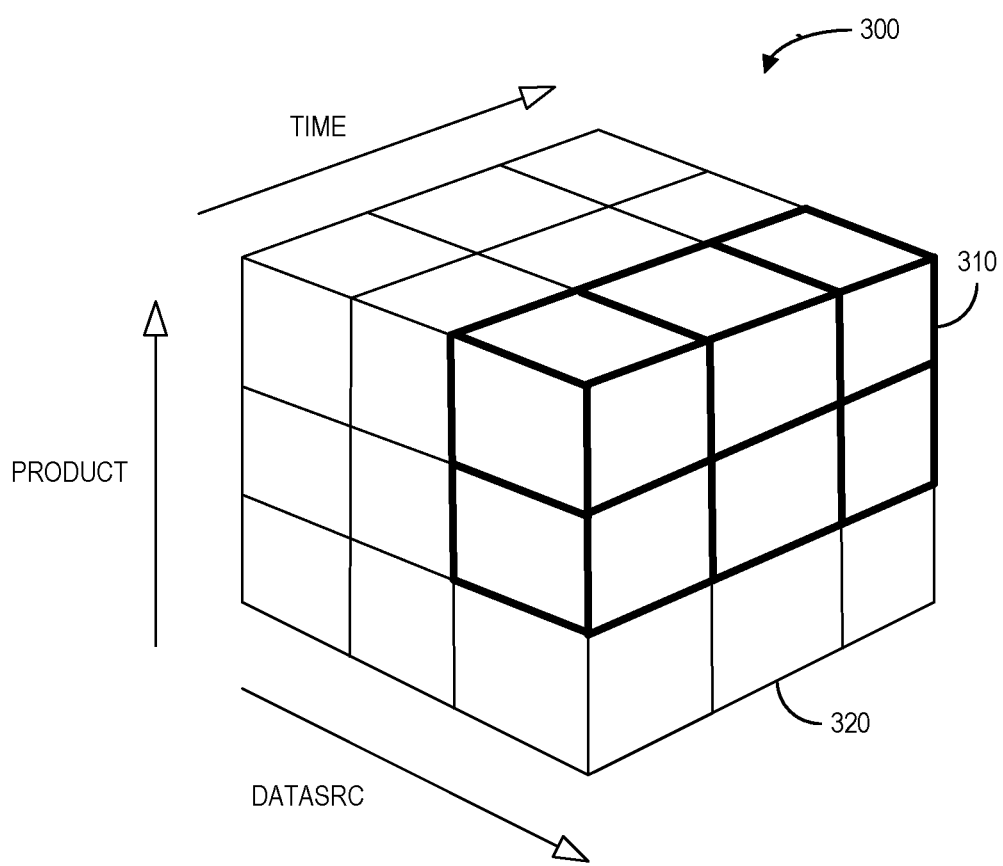
FIG. 3 is an example of an analytic data cube according to some embodiments.

Note that the "ELSE" condition cannot be expressed as regular structure. "IF" condition prescribe a scope like portion 310 of cube 300 illustrated in FIG. 3. Note that the rest of the cube (the "ELSE" part) defines scope 320 which has an irregular shape.

There are many possibilities to define a condition to return irregular block. As can be seen in an example which is associated with an extremely simple model and simple condition. As a result, a planning script might not support "ELSE". There is a possibility to have irregular scope by combination of "IF" and "ELSEIF". A planning script may treat "IF" and "ELSEIF" separately. This means that if there is overwrapped scope between "IF" and "ELSEIF", the "ELSEIF" might not get rid of the overwrapped scope.

A ResultLookup can get a specific cell value(s) and its POV or can operate with multiple cells in a dice with POV by the combination with the scope and POV parameters of the ResultLookup.

Some embodiments may support a fully qualified POV in ResultLookup:

```
Data([d/ACCOUNT] ="REVENUE", [d/PLANT] ="PLT01", [d/AUDIT] ="None", [d/PRODUCT]
="16GB", [d/TIME] ="201801") = ResultLookup([d/ACCOUNT]="Quantity", [d/PLANT]
="PLT01", [d/AUDIT] ="None", [d/PRODUCT]="16GB", [d/TIME] ="201801") *
ResultLookup([d/ACCOUNT] ="Price", [d/PLANT]="#", [d/AUDIT]="None", [d/PRODUCT]
="16GB", [d/TIME] ="201801")
ResultLookup([d/ACCOUNT] ="Quantity", [d/PLANT] ="PLT01", [d/AUDIT] ="None",
[d/PRODUCT] ="16GB", [d/TIME] ="201801") will return one record with 5000 like below.
Second ResultLookup will also return a record with cell value like [Price, #, None, 16GB, 201801,
100] for mathematical calculation and data generation.
```

The first ResultLookup result is provided in Table 3:

TABLE 3

| ACCOUNT | PLANT | AUDIT | PRODUCT | TIME | SIGNEDDATA |
|---|---|---|---|---|---|
| QUANTITY | PLT01 | None | 16 GB | 201801 | 5000 |

The second ResultLookup result is provided in Tables 4:

TABLE 4

| ACCOUNT | PLANT | AUDIT | PRODUCT | TIME | SIGNEDDATA |
|---|---|---|---|---|---|
| Price | # | None | 16 GB | 201801 | 100 |

A newly calculated result by "DATA" instruction is illustrated in Table 5:

TABLE 5

| ACCOUNT | PLANT | AUDIT | PRODUCT | TIME | SIGNEDDATA |
|---|---|---|---|---|---|
| REVENUE | PLT01 | None | 16 GB | 201801 | 500000 |

If ResultLookup has fully qualified POV with fixed members like this example, the scope won't influence ResultLookup(s). Because, all POV were overwritten by the parameters instead of inheriting from the scope.

It can be difficult to define and maintain all calculations with fully qualified POV. To support flexibility, a planning script may support partial POV parameter in the ResultLookup. The purpose of ResultLookup([d/ACCOUNT]= "Price", [d/PLANT]="#", [d/AUDIT]="None") that has partial POV as parameters is to get [d/PLANT] and [d/AUDIT] independent Price. It means whatever members of [d/PLANT] and [d/AUDIT] dimensions in a POV, the value of "Price" is always same. And "Price" depends on the combination of rest dimensions ([d/PRODUCT], [d/TIME]) which are not parameters of it. The ResultLookup represents a set of values with [d/PRODUCT] and [d/TIME] combination with the calculation scope.

```
MEMBERSET [d/PRODUCT] = ("16GB", "32GB", "64GB")
MEMBERSET [d/TIME] = ("201701", "201702")
Data([d/ACCOUNT] ="Revenue") = ResultLookup([d/ACCOUNT] ="Price", [d/PLANT] ="#",
[d/AUDIT] ="None") * ResultLookup([d/ACCOUNT] ="Quantity")
```

The script step gets the scope for [d/PRODUCT] (16 GB, 32 GB, 64 GB) and [d/TIME] (201701, 201702) previously with the MEMBERSETs. So, ResultLookup([d/ACCOUNT]="Price", [d/PLANT]="#", [d/AUDIT]="None") returns the records shown in Table 6:

TABLE 6

| ACCOUNT | PLANT | AUDIT | PRODUCT | TIME | SIGNEDDATA |
|---|---|---|---|---|---|
| PRICE | # | None | 16 GB | 201701 | 100 |
| PRICE | # | None | 32 GB | 201701 | 200 |
| PRICE | # | None | 16 GB | 201702 | 110 |
| PRICE | # | None | 64 GB | 201702 | 350 |

A planning script may create new records based on user defined calculations in the script and it writes back the records into the analytic cloud model (PDC) at the end of the data action. The Data is opposite function with the ResultLookup because it is setting values not getting. The Data has very similar functionality with the ResultLookup in the parameter. The Data can set a specific cell value(s) and its POV or can operate multiple cells with the result of the ResultLookup(s). Consider for example:

```
Data([d/ACCOUNT] ="REVENUE", [d/CATEGORY] ="PLAN", [d/TIME] ="201801") =
ResultLookup([d/ACCOUNT] ="REVENUE", [d/CATEGORY] ="ACTUAL",
[d/TIME]="201701") * 1.05
```

This is a simple example to initialize "201801" plan data with 201701 with 5% increase. If there is no filter on PLANT, AUDIT, PRODUCT dimensions. All REVENUE records of "201701" will be copied to "201801" with 5% increase. The ResultLookup in right side will return the records illustrated in Table 7:

TABLE 7

| ACCOUNT | PLANT | CATEGORY | PRODUCT | TIME | SIGNEDDATA |
|---|---|---|---|---|---|
| REVENUE | PLT01 | ACTUAL | 16 GB | 201701 | 100 |
| REVENUE | PLT01 | ACTUAL | 32 GB | 201701 | 200 |
| REVENUE | PLT02 | ACTUAL | 16 GB | 201701 | 110 |
| REVENUE | PLT03 | ACTUAL | 64 GB | 201701 | 350 |

Then, Planning Script process Data([d/ACCOUNT]="REVENUE", [d/CATEGORY]="PLAN", [d/TIME]="201801") with above record list. [d/ACCOUNT] dimension will be overwritten by "REVENUE" and [d/CATEGORY] by "PLAN" and [d/TIME] by "201801" simply. And Signed Data will be multiplied by 1.05 as shown in Table 8:

TABLE 8

| ACCOUNT | PLANT | CATEGORY | PRODUCT | TIME | SIGNEDDATA |
|---|---|---|---|---|---|
| REVENUE | PLT01 | PLAN | 16 GB | 201801 | 105 |
| REVENUE | PLT01 | PLAN | 32 GB | 201801 | 210 |
| REVENUE | PLT02 | PLAN | 16 GB | 201801 | 115.5 |
| REVENUE | PLT03 | PLAN | 64 GB | 201801 | 367.5 |

The script can be improved to apply different ratio by product.

```
IF [d/PRODUCT] ="16GB" THEN
    Data([d/ACCOUNT] ="REVENUE", [d/CATEGORY] ="PLAN", [d/TIME] ="201801") =
    ResultLookup([d/ACCOUNT] ="REVENUE", [d/CATEGORY] ="ACTUAL", [d/TIME]
    ="201701") * 1.05
ELSEIF [d/PRODUCT] = "32GB" THEN
    Data([d/ACCOUNT] ="REVENUE", [d/CATEGORY] ="PLAN", [d/TIME] ="201801") =
    ResultLookup([d/ACCOUNT] ="REVENUE", [d/CATEGORY] ="ACTUAL", [d/TIME]
    ="201701") * 1.20
ENDIF
```

By [d/PRODUCT] filter, a user can differentiate increase factor by product. We can little bit simplify script because it uses same [d/ACCOUNT] member.

```
IF [d/ACCOUNT] ="REVENUE" THEN
    IF [d/PRODUCT] ="16GB" THEN
        Data([d/CATEGORY] ="PLAN", [d/TIME] ="201801") =
        ResultLookup([d/CATEGORY] ="ACTUAL", [d/TIME] ="201701") * 1.05
    ELSEIF [d/PRODUCT] = "32GB" THEN
        Data([d/CATEGORY] ="PLAN", [d/TIME] ="201801") =
        ResultLookup([d/CATEGORY] ="ACTUAL", [d/TIME] ="201701") * 1.20
    ENDIF
ENDIF
```

By using TIME function, we can change it like below to support dynamic TIME. And it will cover multiple months. Assumption of TIME granularity is Monthly based.

```
MEMBERSET [d/TIME] = ("201801", "201802", "201803")
IF [d/ACCOUNT] ="REVENUE" THEN
    IF [d/PRODUCT] ="16GB" THEN
        Data([d/CATEGORY] ="PLAN") = ResultLookup([d/CATEGORY] ="ACTUAL",
        [d/TIME] = PREVIOUS(12)) * 1.05
    ELSEIF [d/PRODUCT] = "32GB" THEN
        Data([d/CATEGORY] ="PLAN") = ResultLookup([d/CATEGORY] ="ACTUAL",
        [d/TIME] = PREVIOUS(12)) * 1.20
    ENDIF
ENDIF
```

Note that a user can change TIME calculation scope like below even it is source scope not target one:

```
MEMBERSET TIME = ("201701", "201702", "201703")
IF [d/ACCOUNT] ="REVENUE" THEN
    IF [d/PRODUCT] ="16GB" THEN
        Data([d/CATEGORY] ="PLAN", [d/TIME] = NEXT(12)) =
        ResultLookup([d/CATEGORY] ="ACTUAL") * 1.05
    ELSEIF [d/PRODUCT] = "32GB" THEN
        Data([d/CATEGORY] ="PLAN", [d/TIME] = NEXT(12)) =
        ResultLookup([d/CATEGORY] ="ACTUAL") * 1.20
    ENDIF
ENDIF
```

According to some embodiments, a user may initialize multiple cells with a cell value. For example, a user might copy ("8 GB", "201701") value(s) into the scope with three products and two time periods.

```
MEMBERSET [d/PRODUCT] = ("16GB", "32GB", "64GB")
MEMBERSET [d/TIME] = ("201801", "201802")
Data( ) = ResultLookup([d/PRODUCT] ="8GB", [d/TIME] ="201701")
```

The above script would work in the same way with below.

```
Data([d/PRODUCT] = "16GB", [d/TIME] = "201801") =
ResultLookup([d/PRODUCT] ="8GB", [d/TIME] ="201701")
Data([d/PRODUCT] = "16GB", [d/TIME] = "201802") =
ResultLookup([d/PRODUCT] ="8GB", [d/TIME] ="201701")
Data([d/PRODUCT] = "32GB", [d/TIME] = "201801") =
ResultLookup([d/PRODUCT] ="8GB", [d/TIME] ="201701")
Data([d/PRODUCT] = "32GB", [d/TIME] = "201802") =
ResultLookup([d/PRODUCT] ="8GB", [d/TIME] ="201701")
Data([d/PRODUCT] = "64GB", [d/TIME] = "201801") =
ResultLookup([d/PRODUCT] ="8GB", [d/TIME] ="201701")
Data([d/PRODUCT] = "64GB", [d/TIME] = "201802") =
ResultLookup([d/PRODUCT] ="8GB", [d/TIME] ="201701")
```

The ResultLookup has two parameters with fixed member ID for two dimensions [d/PRODUCT] and [d/TIME]. And Data doesn't have parameters for the both dimensions. Then fixed POV in the ResultLookup will be overwritten by the scope. For example, fixed member "201701" in the ResultLookup will be used as a source of TIME "201801" and "201802".

That that this might be the same as:

```
IF [d/PRODUCT] = ("16GB", "32GB", "64GB") AND [d/TIME] =
("201801", "201802") THEN
Data( ) = ResultLookup([d/PRODUCT] ="8GB", [d/TIME] ="201701")
ENDIF
```

There may be similar cases for multiple cells:

```
// all REV01, REV02, REV03 will have "Price" * "Quantity.
MEMBERSET [d/ACCOUNT] = ("REV01", "REV02", "REV03")
Data( ) = ResultLookup([d/ACCOUNT] ="Price") * ResultLookup([d/ACCOUNT] ="Quantity")
//All products "16GB", "32GB", "64GB" will have same each PLANT'S product value.
MEMBERSET [d/PRODUCT] =("16GB", "32GB", "64GB")
Data( ) = ResultLookup([d/PRODUCT] = [d/PLANT].[p/PRODUCT])
MEMBERSET [d/PLANT] = ("PLT01", "PLT02", "PLT03")
DATA([d/ACCOUNT] ="REVENUE") = ResultLookup ([d/ACCOUNT] ="PRICE", [d/PLANT]
="#") * ResultLookup ([d/ACCOUNT] ="QUANTITY", [d/PLANT] ="PLT01")
```

FIG. 4 illustrates a result 400 of such instructions. Note that the above script is calculating "Revenue" for 3 plants by multiplying plant independent Price and Quantity of plant01. In this calculation, script can join two tables with [d/AUDIT], [d/PRODUCT] and [d/TIME] fields. And [d/ACCOUNT] member would be "REVENUE" by Data's parameter. But, the calculation doesn't care what plant among 3 plants was given. In other words, all revenue of 3 plants will be calculated regardless of POV of plant. Then, all calculated records will be copied to 3 plants which are in the calculation scope.

Note that a calculation can be done by just assigning numeric value into the Data in theory. But zero and EMPTY are different technically in the analytic cube. EMPTY means there is no record in the cell. Zero means summation of records with same POV is zero.

Data( )=0

Above script can work by invalidating current records in the calculation scope. It means setting cells of the scope with zero in case there are records in the calculation scope. And the cells will stay as EMPTY in case there is no record in PDC.

Data( )=100

It is risky not like zero initialization since it can generate huge records based on calculation scope. It requires records by Cartesian product with full dimensions in the scope.

Consider the following:

```
Data([d/ACCOUNT] ="Price", [d/PLANT] ="#", [d/AUDIT] ="NONE",
[d/PRODUCT] ="16GB", [d/TIME] ="201701") = 0
```

Which is a very simple calculation that Price of "16 GB" product at "201701" with [d/Plant] (#), [d/AUDIT] (None) will be set as zero. It will generate a below record in case there is a record already and overwrite cell value with zero whatever the cell value was as illustrated in Table 9.

TABLE 9

| ACCOUNT | PLANT | AUDIT | PRODUCT | TIME | SIGNEDDATA |
|---------|-------|-------|---------|------|------------|
| PRICE | # | None | 16 GB | 201701 | 0 |

Also consider:

```
MEMBERSET [d/PRODUCT] =("16GB", "32GB", "64GB")
Data([d/ACCOUNT] ="Price", [d/PLANT] ="#", [d/AUDIT] ="NONE",
[d/TIME] ="201701") = 0
```

If there is no [d/PRODUCT] dimension's POV, [d/PRODUCT] dimension's scope will be decided by the scope. (If scope of [d/PRODUCT] is not defined by MEMBERSET previously, all [d/PRODUCT] members are in the scope.) Because [d/PRODUCT] scope is defined like (16 GB, 32 GB, 64 GB), above expression will initialize three records in case there are three records in the PDC. And overwrite cell values with zero in PDC at the end as illustrated in Table 10.

TABLE 10

| ACCOUNT | PLANT | AUDIT | PRODUCT | TIME | SIGNEDDATA |
|---|---|---|---|---|---|
| PRICE | # | None | 16 GB | 201701 | 0 |
| PRICE | # | None | 32 GB | 201701 | 0 |
| PRICE | # | None | 64 GB | 201701 | 0 |

A script logic engine will process calculation based on current source which is defined in the ResultLookup(s). In other words, if there is no source record, script logic engine won't process calculation instead assume no source record as zero. Then there is a problem with garbage records in the calculation range. See below example.

MEMBERSET [d/ACCOUNT] = "Sales"
MEMBERSET [d/PRODUCT] = ("16GB", "32GB", "64GB")
Data([d/TIME] ="201801") = ResultLookup([d/TIME] ="201701") * 1.05

This logic is to increase Sales 5% from "201701". It means if there is no "Sales" in "201701", the value should be zero. Table 11 is the result of the ResultLookup([d/TIME]= "201701"). There is no 64 GB's Sales record in "201701", then 64 GB's "201801" value should be zero by the script.

TABLE 11

| ACCOUNT | PLANT | AUDIT | PRODUCT | TIME | SIGNEDDATA |
|---|---|---|---|---|---|
| Sales | PLT01 | None | 16 GB | 201701 | 1000 |
| Sales | PLT01 | None | 32 GB | 201701 | 1500 |

Table 12 illustrates that there were already some records in "201801" in analytic cloud model before the script execution.

TABLE 12

| ACCOUNT | PLANT | AUDIT | PRODUCT | TIME | SIGNEDDATA |
|---|---|---|---|---|---|
| Sales | PLT01 | None | 16 GB | 201801 | 500 |
| Sales | PLT01 | None | 64 GB | 201801 | 600 |

If the script logic processes calculation based on ResultLookup's result only, result of calculation would be below based on previous explanation. Sales of 64 GB exists still not like user expectation as illustrated in Table 13.

TABLE 13

| ACCOUNT | PLANT | AUDIT | PRODUCT | TIME | SIGNEDDATA |
|---|---|---|---|---|---|
| Sales | PLT01 | None | 16 GB | 201801 | 1050 |
| Sales | PLT01 | None | 32 GB | 201801 | 1575 |
| Sales | PLT01 | None | 64 GB | 201801 | 600 |

Note that the script logic should initialize calculation scope which will be overwritten by calculation. Then, user will not see wrong calculation result ("Sales", "64 GB", 600).

All previous examples processed only one ResultLookup for "Data" function. Then, there was no confusion in POV. Just following ResultLookup's POV basically, and overwrite some POV by the parameters of "Data". But, if there are multiple ResultLookups in the calculation and each ResultLookup has different POV, which POV will be inherited to the "Data". Then, it needs to treat multiple ResultLookups in the calculation.

Data([d/ACCOUNT] ="REVENUE") = ResultLookup([d/ACCOUNT] ="PRICE") * ResultLookup([d/ACCOUNT] ="QUANTITY")

This calculation is still simple even though it will process multiple records at once. For example, the scope for this calculation is [d/PRODUCT]=("16 GB", "32 GB"), [d/AUDIT]="NONE", [d/TIME]="201801" and [d/PLANT]= "PLT01". Planning Script should collect two record set from two ResultLookups. The first ResultLookup Result with "Price" is shown in Table 14:

TABLE 14

| ACCOUNT | PLANT | AUDIT | PRODUCT | TIME | SIGNEDDATA |
|---|---|---|---|---|---|
| PRICE | PLT01 | None | 16 GB | 201801 | 100 |
| PRICE | PLT01 | None | 32 GB | 201801 | 200 |

The second ResultLookup Result with "Quantity" is shown in Table 15:

TABLE 15

| ACCOUNT | PLANT | AUDIT | PRODUCT | TIME | SIGNEDDATA |
|---|---|---|---|---|---|
| QUANTITY | PLT01 | None | 16 GB | 201801 | 5000 |
| QUANTITY | PLT01 | None | 32 GB | 201801 | 3000 |

Note that the script can easily match price and quantity with other dimensions. The connection between two result sets is clear. For example, Table 16 shows two results of Two ResultLookups join each other with [d/PLANT], [d/AUDIT], [d/PRODUCT] and [d/TIME] fields for the following Data ([d/ACCOUNT]="REVENUE") will generate two new records for 16 GB and 32 GB with [d/ACCOUNT] REVENUE POV like below. Table 16 shows the result of "Data([d/ACCOUNT]="REVENUE"):

TABLE 16

| ACCOUNT | PLANT | AUDIT | PRODUCT | TIME | SIGNEDDATA |
|---|---|---|---|---|---|
| REVENUE | PLT01 | None | 16 GB | 201801 | 500000 |
| REVENUE | PLT01 | None | 32 GB | 201801 | 600000 |

But, usually "PRICE" is driver value that will not require specific [d/PLANT] member and [d/AUDIT] is "None". In other words, same Price will be multiplied with quantity regardless of kind of member of [d/PLANT]. Then the script will be changed for "Price" with different POV compared with "Quantity" which depends on the [d/PLANT].

Data([d/ACCOUNT] ="REVENUE") = ResultLookup([d/ACCOUNT] ="PRICE", [d/PLANT] ="#", [d/AUDIT] ="NONE") * ResultLookup([d/ACCOUNT] ="QUANTITY")

As illustrated in FIG. 6, two ResultLookup will return below two record set like above example. Because Price is a driver value which is [d/PLANT] independent, [d/PLANT] members between two result set are different. And [d/AUDIT] is also different. And number of records between two record set is also different. The "REVENUE" may be calculated with above two results of the two ResultLookups. Below is the way to match proper "Price" and "Quantity".

Match common dimensions not used as parameters between RESULTLOOKUPS. It means dimensions which inherit calculation scope from current calculation range is common one. Because, [d/ACCOUNT], [d/PLANT] and [d/AUDIT] are differently defined between them. Only [d/PRODUCT] and [d/TIME] would be key fields to be used in the JOIN as illustrated in FIG. 7.

Not like common dimensions, [d/PLANT] and [d/AUDIT] dimensions are re-defined in only one ResultLookup. In this case, [d/PLANT] and [d/AUDIT] dimensions should have NOT re-defined records to keep more granularity as shown in Table 17:

TABLE 17

| ACCOUNT | SIGNEDDATA | ACCOUNT | PLANT | AUDIT | PRODUCT | TIME | SIGNEDDATA |
|---|---|---|---|---|---|---|---|
| PRICE | 100 | QUANTITY | PLT01 | Manual | 16 GB | 201801 | 1000 |
| PRICE | 200 | QUANTITY | PLT01 | Manual | 32 GB | 201801 | 4000 |
| PRICE | 100 | QUANTITY | PLT02 | Adjustment | 16 GB | 201801 | 2000 |
| PRICE | 200 | QUANTITY | PLT03 | Manual | 32 GB | 201801 | 3000 |

[d/ACCOUNT] is re-defined in both ResultLookups. There is no rule for [d/ACCOUNT] member as a calculated result at this moment. Then, [d/ACCOUNT] should be re-defined in "DATA" instruction to set specific member in the field. If not, it will generate same records for all [d/ACCOUNT] members in the current calculation scope as shown in Table 18:

TABLE 18

| ACCOUNT | PLANT | AUDIT | PRODUCT | TIME | SIGNEDDATA |
|---|---|---|---|---|---|
| REVENUE | PLT01 | Manual | 16 GB | 201801 | 100000 |
| REVENUE | PLT01 | Manual | 32 GB | 201801 | 800000 |
| REVENUE | PLT02 | Adjustment | 16 GB | 201801 | 200000 |
| REVENUE | PLT03 | Manual | 32 GB | 201801 | 600000 |

Note that all below scripts may work in same way.

a. Data(ACCOUNT="REVENUE") = RESULTLOOKUP(ACCOUNT="PRICE", PLANT="#", AUDIT="NONE") * RESULTLOOKUP(ACCOUNT="QUANTITY"
b. Data(ACCOUNT="REVENUE") = RESULTLOOKUP(ACCOUNT="QUANTITY") * RESULTLOOKUP(ACCOUNT="PRICE", PLANT="#", AUDIT="NONE")
c. IF ACCOUNT="PRICE" THEN
    Data(ACCOUNT="REVENUE") = RESULTLOOKUP(PLANT="#", AUDIT="NONE") *
    RESULTLOOKUP(ACCOUNT="QUANTITY")
ENDIF
d. IF ACCOUNT="QUANTITY" THEN
    Data(ACCOUNT="REVENUE") = RESULTLOOKUP(ACCOUNT="PRICE",
    PLANT="#", AUDIT="NONE") * RESULTLOOKUP( )
ENDIF
e. IF ACCOUNT="REVENUE" THEN // Condition with Data(target) may be improper
    Data( ) = RESULTLOOKUP(ACCOUNT="PRICE", PLANT="#", AUDIT="NONE") *
    RESULTLOOKUP(ACCOUNT="QUANTITY")
ENDIF With respect to a generalized mapping method between two ResultLookups, note that there may be three cases between same dimension field in two results:

Both results have dynamic member(s) from the calculation scope. PRODUCT, TIME in the example.

One result is dynamic member(s) and another is a fixed one. PLANT, AUDIT in the example.

Both results have a fixed member. ACCOUNT in the example.

What if a user adds one more element "LOSS RATE" which is dependent on PLANT and PRODUCT dimensions into the above REVENUE calculation scenario?

```
Data([d/ACCOUNT] ="REVENUE") = ResultLookup([d/ACCOUNT]
="PRICE", [d/PLANT] ="#", [d/AUDIT] ="NONE") * ResultLookup([d/ACCOUNT]
="QUANTITY") * (1 − ResultLookup([d/ACCOUNT] ="LOSS_RATE", [d/AUDIT] ="NONE",
[d/PRODUCT] ="#")
```

Table 19 shows the first ResultLookup:

TABLE 19

| ACCOUNT | PLANT | AUDIT | PRODUCT | TIME | SIGNEDDATA |
|---|---|---|---|---|---|
| PRICE | # | None | 16 GB | 201801 | 100 |
| PRICE | # | None | 32 GB | 201801 | 200 |

Table 20 shows the second ResultLookup:

TABLE 20

| ACCOUNT | PLANT | AUDIT | PRODUCT | TIME | SIGNEDDATA |
|---|---|---|---|---|---|
| QUANTITY | PLT01 | Manual | 16 GB | 201801 | 1000 |
| QUANTITY | PLT01 | Manual | 32 GB | 201801 | 4000 |
| QUANTITY | PLT02 | Adjustment | 16 GB | 201801 | 2000 |
| QUANTITY | PLT03 | Manual | 32 GB | 201801 | 3000 |

Table 21 shows the third ResultLookup:

TABLE 21

| ACCOUNT | PLANT | AUDIT | PRODUCT | TIME | SIGNEDDATA |
|---|---|---|---|---|---|
| LOSS_RATE | PLT01 | None | # | 201801 | 0.1 |
| LOSS_RATE | PLT02 | None | # | 201801 | 0.2 |

As first and second was matched previously, table 22 is first/second result:

TABLE 22

| ACCOUNT | PLANT | AUDIT | PRODUCT | TIME | SIGNEDDATA |
|---|---|---|---|---|---|
| | PLT01 | Manual | 16 GB | 201801 | 100000 |
| | PLT01 | Manual | 32 GB | 201801 | 800000 |
| | PLT02 | Adjustment | 16 GB | 201801 | 200000 |
| | PLT03 | Manual | 32 GB | 201801 | 600000 |

Then, it needs to match third and the result of first/second. There is no LOSS_RATE at "PLT03" so the final result of calculation would not have a "PLT03" cell.

Figure 8:

The first, second, and third are shown in FIG. 8 wherein the final is shown in Table 23:

TABLE 23

| ACCOUNT | PLANT | AUDIT | PRODUCT | TIME | SIGNEDDATA |
|---|---|---|---|---|---|
| REVENUE | PLT01 | Manual | 16 GB | 201801 | 90000 |
| REVENUE | PLT01 | Manual | 32 GB | 201801 | 720000 |
| REVENUE | PLT02 | Adjustment | 16 GB | 201801 | 160000 |
| REVENUE | PLT03 | Manual | 32 GB | 201801 | 600000 |

Even though script logic matches and calculated SIGNED-DATA with 3 ResultLookup result tables one by one in above explanation, the final SIGNEDDATA will be calculated at the end at once technically. To map 3 ResultLookups and to do its calculation in above example, there would be an interim table will be created for mapping 3 tables like below. All three ResultLookups have fixed ACCOUNT member differently, [d/ACCOUNT] field will be empty. And final calculated values will be filled in SIGNEDDATA field before handover calculation to "Data" instruction as shown in Table 23:

TABLE 24

| ACCOUNT | PLANT | AUDIT | PRODUCT | TIME | PRICE | QUANTITY | LOSS_RATE | SIGNED DATA |
|---|---|---|---|---|---|---|---|---|
| | PLT01 | Manual | 16 GB | 201801 | 100 | 1000 | 0.1 | |
| | PLT01 | Manual | 32 GB | 201801 | 200 | 4000 | 0.1 | |
| | PLT02 | Adjustment | 16 GB | 201801 | 100 | 2000 | 0.2 | |
| | PLT03 | Manual | 32 GB | 201801 | 200 | 3000 | — | |

Note that it may be source of "Data" instruction. In the example, "Data" instruction does just "replacement" of [d/ACCOUNT] member with "REVENUE".

Embodiments may adopt the general mapping method at 3 RESULTLOOKUPs:

```
        Dynamic + Dynamic => Use as JOIN field (output is
        Dynamic)
        Dynamic + Fixed => Use Dynamic field (output is Dynamic)
        Fixed + Fixed => Leave it as EMPTY to be filled by "DATA"
        (output is Fixed.)
First RESULTLOOKUP & Second ResultLookup
        Dynamic + Dynamic => [d/PRODUCT], [d/TIME]
        Dynamic + Fixed => [d/PLANT], [d/AUDIT] (fill the fields with
        2nd ResultLookup result)
        Fixed + Fixed => [d/ACCOUNT]
Then, the result of the First and the Second is:
        Dynamic => [d/PRODUCT], [d/TIME], [d/PLANT], [d/AUDIT]
        Fixed => [d/ACCOUNT]
Mapping with the third.
        Dynamic + Dynamic => [d/PLANT], [d/TIME]
        Dynamic + Fixed => [d/AUDIT], [d/PRODUCT] (fill the fields
        with the firstly merged result
        (1st+2nd))Fixed + Fixed => [d/ACCOUNT]
```

The previous examples for mapping between multiple ResultLookup couldn't cover all the case. Because condition of the previous examples was parameter dimensions in a ResultLookup contains all parameter dimensions of another ResultLookup.

Below is an example that the script cannot adopt the mapping method defined previously.

```
MEMBERSET [d/PLANT] = ("PLT01", "PLT02", "PLT03")
MEMBERSET [d/AUDIT] = ("Manual", "Adjustment")
Data([d/ACCOUNT] ="REVENUE") = ResultLookup([d/ACCOUNT] ="PRICE", [d/PLANT]
="#") * ResultLookup([d/ACCOUNT] ="QUANTITY", [d/AUDIT] ="NONE")
// cannot join using common dimensions ([d/PRODUCT], [d/TIME]) because of [d/PLANT] and
[d/AUDIT] using below results of ResultLookup.
```

Figure 9:

Refer to FIG. 9, which shows that an audit is dynamic in the first ResultLookup, then [d/AUDIT] members should be copied to the join table. And plant is dynamic in the second one. [d/PLANT] members should be copied to the join table. Both cannot be done because of different number of records and lack of mapping information. However, the script should work correctly. The value of {"Revenue", "Manual", "PLT01", "16 GB", "201801"} can be calculated by {"Price", "Manual", "#", "16 GB", "201801"}*{"Quantity", "None", "PLT01", "16 GB", "201801"}. The result tables of the two ResultLookup are not enough to be mapped by each cell level because of loss of POV. To have additional information for mapping, the calculation scope of two dimensions, [d/PLANT] and [d/AUDIT] would have original member ID before replacement with "#" and "None" as shown in Tables 25 and 26:

TABLE 25

| PLANT | PLANT_Fixed |
|---|---|
| PLT01 | # |
| PLT02 | # |
| PLT03 | # |

TABLE 26

| AUDIT | AUDIT_Fixed |
|---|---|
| Manual | None |
| Adjustment | None |

Figure 10:
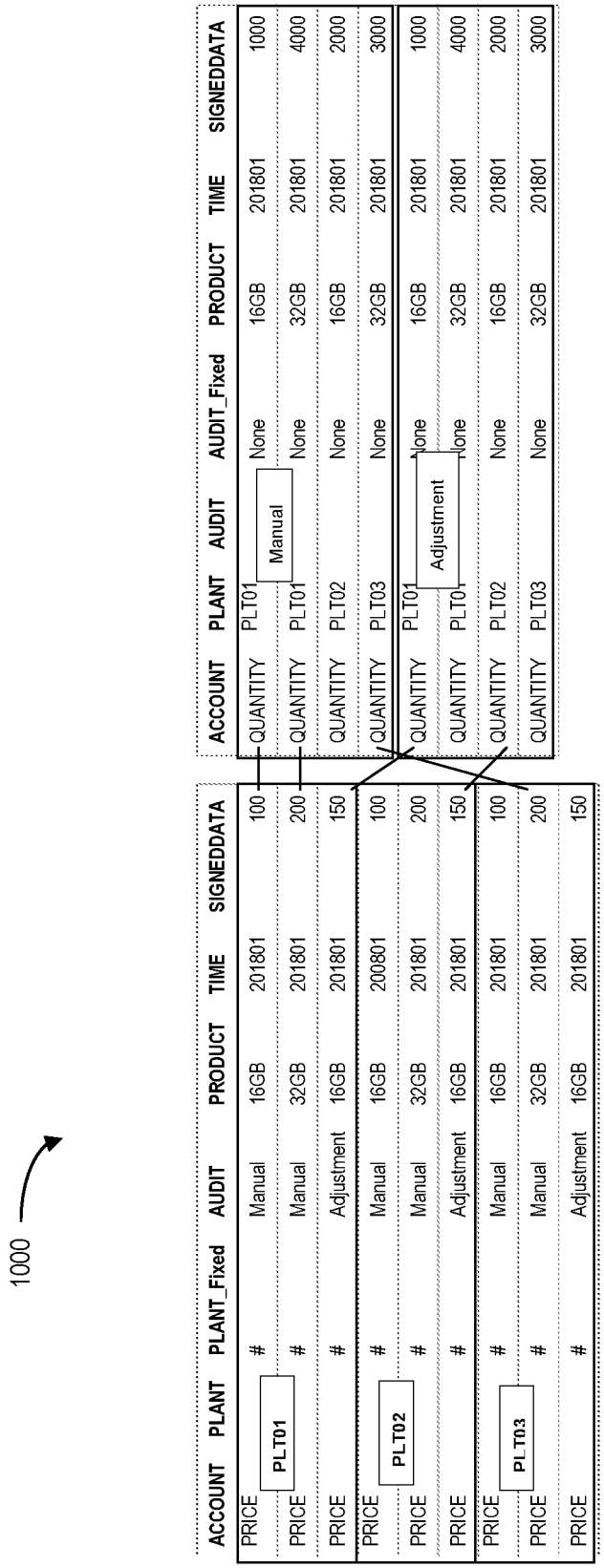

And the results of the two ResultLookups would be as shown in FIG. 10.

Originally, first ResultLookup returns three records with "#" member of [d/PLANT]. But, because of lack of mapping with the result of second ResultLookup, it should be three set of three records with each member of [d/PLANT] as results of first ResultLookup with the entire calculation scope. And, the result of second ResultLookup also has two sets for "Manual" and "Adjustment" vice versa as shown in FIG. 11. FIG. 11 shows the mapping result 1100 of two ResultLookups to be calculated which was created by "outer join".

Aggregating several cells values into one cell is possible by handling Data instruction with POV parameters. For example, a user wants to collect several account values which are CashFlow related, and aggregate all values and create new account "OperatingCashFlow" as shown in Table 27:

TABLE 27

| ACCOUNT | PLANT | AUDIT | PRODUCT | TIME | SIGNED-DATA |
|---|---|---|---|---|---|
| PRICE | # | None | 16 GB | 201801 | 100 |
| QUANTITY | # | None | 32 GB | 201801 | 200 |
| Account receivable | PLT01 | Manual | 16 GB | 201802 | 2500 |
| Account receivable | PLT01 | Manual | 64 GB | 201802 | 7000 |
| Depreciation | PLT03 | ADJ | # | 201802 | 4000 |
| Account receivable | PLT02 | Manual | 16 GB | 201801 | 5000 |
| Interest_earning | PLT02 | Manual | # | 201801 | 2000 |
| Depreciation | PLT01 | Manual | # | 201801 | 3000 |
| Depreciation | PLT01 | ADJ | # | 201802 | 4000 |

Note that [d/ACCOUNT] scope table has 10 members. Among them, 3 members are "CashFlow" related such as ("additions", "interest earning", "depreciation"). The scope table will have only the 3 members after the "IF ACCOUNT.GROUP="CashFlow" THEN".

Table 28 illustrates results after execution of the following:

```
MEMBERSET [d/AUDIT] = ("Manual", "CONS", "ADJ")
IF [d/ACCOUNT].[p/GROUP] = "CashFlow" THEN
    Data([d/ACCOUNT] ="OperatingCashFlow", [d/AUDIT] ="CF",
```

-continued

```
[d/PRODUCT] ="#") =
ResultLookup( )
ENDIF
```

TABLE 28

| ACCOUNT | PLANT | AUDIT | PRODUCT | TIME | SIGNEDDATA |
|---|---|---|---|---|---|
| OperatingCashFlow | PLT01 | CF | # | 201801 | 3000 |
| OperatingCashFlow | PLT01 | CF | # | 201802 | 13500 |
| OperatingCashFlow | PLT02 | CF | # | 201802 | 7000 |
| OperatingCashFlow | PLT03 | CF | # | 201802 | 4000 |

There are 7 cells "CashFlow" related. Script run calculation and created new 4 records with aggregation by giving POV parameters in DATA instruction. Values were aggregated by [d/TIME] and [d/PLANT] because all [d/AUDIT], [d/PRODUCT] and [d/ACCOUNT] members were overwritten by fixed members. Even though calculation runs with 7 cells and created 7 new cells, some of 7 new cells have same POV and then aggregated as shown in Table 29:

TABLE 29

| | PLANT | AUDIT | PRODUCT | TIME | SIGNEDDATA |
|---|---|---|---|---|---|
| OperatingCashFlow | PLT01 | CF | # | 201801 | 3000 |
| OperatingCashFlow | PLT01 | CF | # | 201802 | 13500 |
| OperatingCashFlow | PLT02 | CF | # | 201802 | 7000 |
| OperatingCashFlow | PLT03 | CF | # | 201802 | 4000 |

There are 3 cells with "201802" and "PLT01" originally. And calculation generated 3 new cells with same [d/ACCOUNT], [d/AUDIT]. At the end, 3 cells with same POV will be aggregated into one cell and written into PDC.

According to some embodiments, a user may aggregate values into several categorized cells instead of a single cell. For example, there are 9 members (Acc01 to Acc09) which will be aggregated into 3 different members (SUM01, SUM02, SUM03). SUM01 will have the sum of Acc01, Acc02 and Acc03. And SUM02 will have Acc04, 05, 06. This can be done by using attribute handling as shown in Table 30.

TABLE 30

| ACCOUNT ID | Sister |
|---|---|
| Acc01 | SUM01 |
| Acc02 | SUM01 |
| Acc03 | SUM01 |
| Acc04 | SUM02 |
| Acc05 | SUM02 |
| Acc06 | SUM02 |
| Acc07 | SUM03 |
| Acc08 | SUM03 |
| Acc09 | SUM03 |

Consider execution of the following:

Data([d/ACCOUNT]=[d/ACCOUNT].[p/Sister])=ResultLookup( )

In this case, the ResultLookup( ) returns the record set of Table 31 according to the scope (the added "Sister" field is only for reference):

TABLE 31

| ACCOUNT | ACCOUNT.Sister | PLANT | AUDIT | PRODUCT | TIME | SIGNEDDATA |
|---|---|---|---|---|---|---|
| ACC01 | SUM01 | | None | 16 GB | 201801 | 100 |
| ACC02 | SUM01 | # | None | 16 GB | 201801 | 200 |
| ACC03 | SUM01 | PLT01 | Manual | 16 GB | 201802 | 2500 |
| ACC04 | SUM02 | PLT01 | Manual | 64 GB | 201802 | 7000 |
| ACC05 | SUM02 | PLT01 | Manual | 64 GB | 201802 | 4000 |
| ACC06 | SUM02 | PLT01 | Manual | 64 GB | 201802 | 5000 |
| ACC07 | SUM03 | PLT02 | ADJ | # | 201801 | 2000 |
| ACC08 | SUM03 | PLT01 | Manual | # | 201802 | 3000 |
| ACC09 | SUM03 | PLT01 | Manual | # | 201802 | 4000 |

Note that the [d/ACCOUNT] field will be updated by [p/Sister] attribute because of the "Data" definition. Then, record set will be aggregated as shown in Table 32:

TABLE 32

| ACCOUNT | PLANT | AUDIT | PRODUCT | TIME | SIGNEDDATA |
|---|---|---|---|---|---|
| SUM01 | # | None | 16 GB | 201801 | 300 |
| SUM01 | PLT01 | Manual | 16 GB | 201802 | 2500 |
| SUM02 | PLT01 | Manual | 64 GB | 201802 | 16000 |
| SUM03 | PLT02 | ADJ | # | 201801 | 2000 |
| SUM03 | PLT01 | Manual | # | 201802 | 7000 |

Consider a situation where a record set from Result-Lookup is assigned to a float type variable. For example
FLOAT fSum
fSum=ResultLookup( )
In this case, fSum will be total of SIGNEDDATA of whole record set from the ResultLookup. Also consider:

```
FLOAT fTotalRevenue
fTotalRevenue = ResultLookup([d/ACCOUNT] ="PRICE", [d/PLANT] ="#",
[d/AUDIT] ="None") * ResultLookup([d/ACCOUNT] ="Quantity")
```

In this case, fTotalRevenue will be total of the result of the calculation of right operand at the end.

There are two use cases at least with the LOOP instruction (FOREACH) because there is a requirement on [d/TIME] sequential calculation such as Carry-Forward. In the case of Loop with [d/TIME], it will execute content of the Loop period sequentially. Another use case is about "group by". There is a case to do calculation with specific member combination of dimensions. For example, each [d/PLANT] may need to allocate "ELECTRONIC" cost to each member of [d/PRODUCT] by ratio of revenue. Here, the total revenue should be calculated by [d/PLANT] and then "ELECTRONIC" cost should be distributed to the products by multiplication with "product revenue"/"total revenue".

The result of each iteration should work as data source in next iteration. For example, calculation result of "201801" should be integrated with data source before "201802" calculation so that "201802" calculation could refer "201801" calculation result. FIG. 12 illustrates 1200 a Loop with [d/TIME] sequence.

Consider

```
MEMBERSET [d/TIME] ="201801" TO "201812"
IF [d/ACCOUNT].[p/ACCTYPE] = ("AST", "LEQ") AND [d/FLOW] = "TEMPORARY" THEN
    FOREACH [d/TIME]
        Data([d/FLOW] ="OPENING") = ResultLookup([d/TIME] =PREVIOUS(1))
        Data([d/FLOW] ="DELTA") = ResultLookup( ) – ResultLookup([d/TIME]
        =PREVIOUS(1))
    ENDFOR
ENDIF
```

In this example, the [d/TIME] scope is 12 months (from 201801 to 201812). It means there are 12 records in the [d/TIME] scope table before the loop. In the Loop, the scope table will be manipulated to iterate members. First iteration will modify the [d/TIME] scope table to have only "201801" member. And second iteration will have "201802" member.

Consider the following Loop for "Group by":

```
MEMBERSET [d/PLANT] =("PLT01", "PLT02")
MEMBERSET [d/TIME] = "201801" TO "201812"
FLOAT TOTREV
```

```
IF ResultLookup([d/ACCOUNT] ="Price", [d/AUDIT] ="#") > 0 THEN
    FOREACH [d/PLANT], [d/TIME]
        TOTREV= 0 // to aggregate quantity by plant & product and use aggregated value for
        following calculations
        IF [d/ACCOUNT] = "REVENUE" THEN
            FOREACH // it will scan all records in the scope. So, user should filter out
            improper record explicitly. If no "revenue" filter, TOTREV will be wrong
            because not revenue record will be calculated together.
                TOTREV = TOTREV + ResultLookup( ) // all products per each
                PLANT
        ENDFOR
    ENDIF
    Data([d/ACCOUNT] ="COGS", [d/AUDIT] ="COSTALLOC") = ResultLookup([d/ACCOUNT]
    ="PLTCOST", [d/AUDIT] ="#", [d/PRODUCT] ="#") * ResultLookup([d/ACCOUNT]
    ="REVENUE") / TOTREV
    Data([d/ACCOUNT] ="PLTCOST", [d/AUDIT] ="#", [d/PRODUCT] ="#") = 0 // because all Plant
    Cost is allocated
    ENDFOR
ENDIF
```

Figure 13:
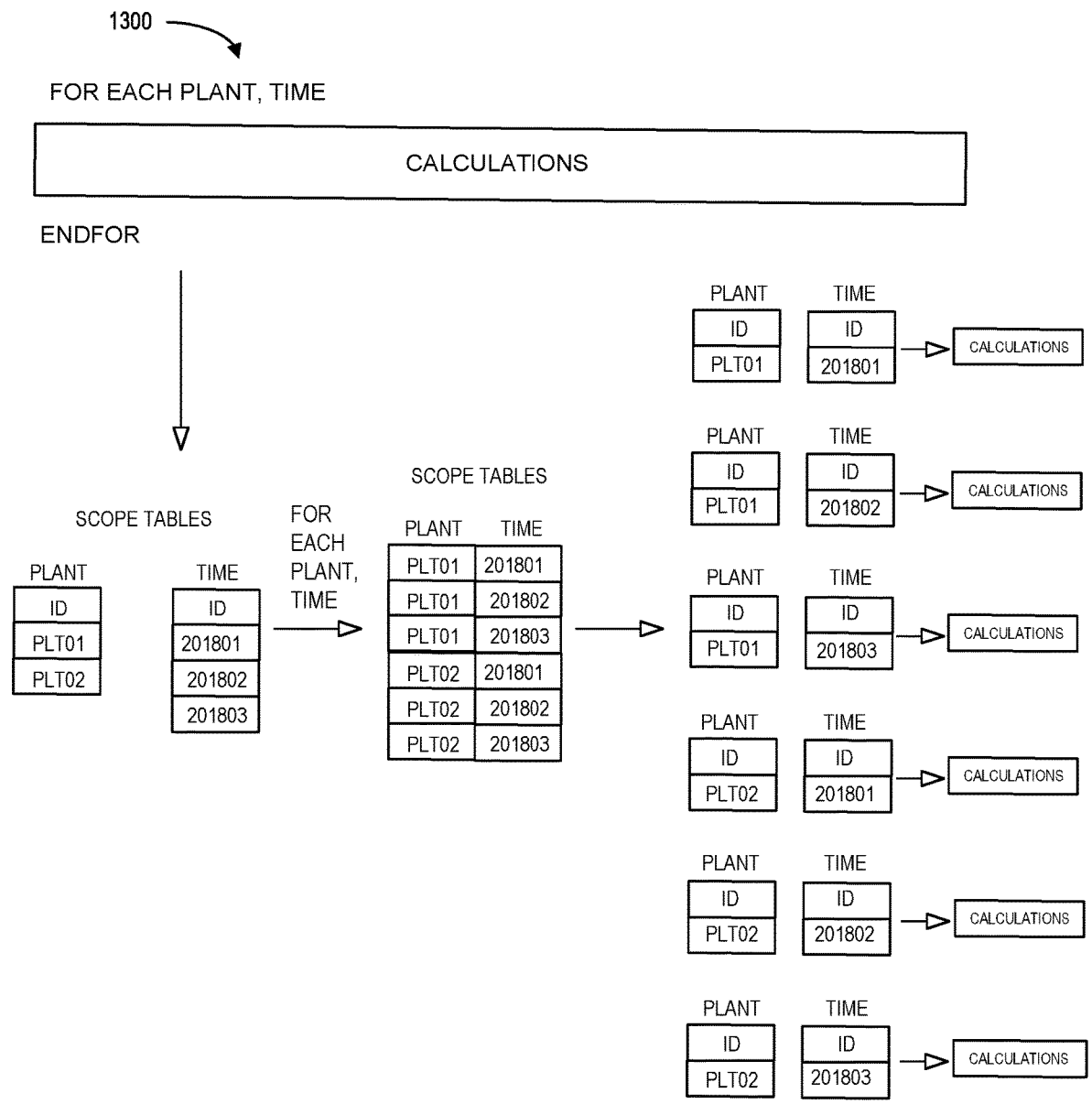

In above example, the loop is declared with two dimensions [d/PLANT] and [d/TIME]. Moreover, [d/PLANT] has two members and [d/TIME] has twelve members in the scope tables. As a result, there are twenty-four combinations possible for iteration. There are 5 scope tables because of 5 dimensions in the model. For the "FOREACH [d/PLANT], [d/TIME]" loop, PLANT and TIME scope tables will be touched. In first iteration, two scope tables will be modified to have only one member for proceeding content of the loop like ("PLT01" and "201801"). In second iteration, the scope tables will have ("PLT01", "201802"). Then the script in the loop will have only scope tables for proceeding consistently as illustrated 1300 in FIG. 13.

Now consider:

```
FOREACH
    TOTREV = TOTREV + ResultLookup( )
ENDFOR
```

In this case, the FOREACH for scanning records one by one can be modified to use just variable with ResultLookup, such as: (TOTREV=ResultLookup( ).

The cell value filter can be used with ResultLookup and its value comparison in IF instruction. Here is an example to filter [d/PLANT] and [d/TIME] in case LOSSRATIO is greater than 10%. LOSSRATIO is independent from individual [d/PRODUCT] member (and the result is in Table 33):

```
IF [d/AUDIT] ="NONE" THEN
    IF ResultLookup([d/ACCOUNT] ="LOSSRATIO", [d/PRODUCT] ="#") > 10 THEN
        Data([d/ACCOUNT] ="PRODUCTION") = ResultLookup([d/ACCOUNT]
        ="PRODUCTION") - ResultLookup([d/ACCOUNT] ="LOSSRATIO",
        [d/PRODUCT] ="#") * ResultLookup([d/ACCOUNT] ="Quantity")
    ENDIF
ENDIF
```

TABLE 33

| ACCOUNT | PLANT | AUDIT | PRODUCT | TIME | SIGNEDDATA |
|---|---|---|---|---|---|
| LOSSRATIO | PLT01 | None | # | 201801 | 15 |
| LOSSRATIO | PLT01 | None | # | 201802 | 9 |
| LOSSRATIO | PLT02 | None | # | 201801 | 8 |
| LOSSRATIO | PLT02 | None | # | 201802 | 13 |

In above data in a model, there are two LossRatio exceeding 10%. ("PLT01", "201801") and ("PLT02", "201802") Then LOSSRATIO should be applied in both cases only. If the script logic handles the scope only by individual dimension's scope tables, it may not be able process this case properly. Then, there should be a way to maintain the scope by multi-dimensional granularity. After [d/AUDIT] filter in the first "IF", there should be 5 individual scope tables for 5 dimensions. In "ResultLookup"

filter in the second "IF", the number of scope tables should be changed from 5 to 4 because two tables for [d/PLANT] and [d/TIME] would be merged to one table. Then, this "IF" block should process the scope by these 4 tables as shown in Table 34:

TABLE 34

| PLANT | TIME | AUDIT |
|---|---|---|
| PLT01 | 201801 | None |
| PLT02 | 201802 | None |

The ResultLookup IF block will use this table for [d/PLANT] and [d/TIME] scopes. Below example has another IF with [d/PLANT] dimension inside the ResultLookup IF. It will filter the [d/PLANT] and [d/TIME] combined table.

TABLE 35

IF [d/AUDIT] ="NONE" THEN
    IF ResultLookup([d/ACCOUNT] ="LOSSRATIO", [d/PRODUCT] ="#") > 10 THEN
        IF [d/PLANT] ="PLT01" THEN

| PLANT | TIME | AUDIT |
|---|---|---|
| PLT01 | 201801 | None |

Data([d/ACCOUNT] ="PRODUCTION") = ResultLookup([d/ACCOUNT] ="PRODUCTION") − ResultLookup([d/ACCOUNT] ="LOSSRATIO", [d/PRODUCT] ="#") * ResultLookup([d/ACCOUNT] ="Quantity")
    ELSEIF [d/PLANT] ="PLT02"

TABLE 36

| | PLANT | TIME | AUDIT |
|---|---|---|---|
| | PLT02 | 201802 | None |
| <Calculation> | | | |
| ENDIF | | | |
| ENDIF | | | |
| ENDIF | | | |

According to some embodiments, multiple cell value filters may have the same granularity. For example, IF ResultLookup([d/ACCOUNT]="Price1", [d/PLANT]="#", [d/AUDIT]="None")>100 AND ResultLookup([d/ACCOUNT]="Price2", [d/PLANT]="#", [d/AUDIT]="None")>100 THEN . . . . In this case, both ResultLookup filters have same dimensions as parameters with AND operator in an IF function. The result of the first ResultLookup is shown in Table 37:

TABLE 37

| ACCOUNT | PLANT | AUDIT | PRODUCT | TIME | SIGNEDDATA |
|---|---|---|---|---|---|
| Price1 | # | None | 16 GB | 201801 | 150 |
| Price1 | # | None | 16 GB | 201802 | 180 |
| Price1 | # | None | 32 GB | 201801 | 300 |
| Price1 | # | None | 64 GB | 201802 | 550 |

The result of the second ResultLookup is shown in Table 38:

TABLE 38

| ACCOUNT | PLANT | AUDIT | PRODUCT | TIME | SIGNEDDATA |
|---|---|---|---|---|---|
| Price2 | # | None | 32 GB | 201801 | 300 |
| Price2 | # | None | 32 GB | 201802 | 900 |
| Price2 | # | None | 16 GB | 201801 | 200 |

Because [d/PLANT] and [d/AUDIT] dimensions are defined with a fixed member ID, both ResultLookups will define new scope with [d/PRODUCT] and [d/TIME] dimensions identically. And both conditions connected with "AND", it should return common scopes of their results only. That is, an (Inner Join) as shown in Table 39:

TABLE 39

| PRODUCT | TIME |
|---|---|
| 32 GB | 201801 |
| 16 GB | 201801 |

Now consider IF ResultLookup([d/ACCOUNT]= "Price1", [d/PLANT]="#", [d/AUDIT]="None")>100 OR ResultLookup([d/ACCOUNT]="Price2", [d/PLANT]="#", [d/AUDIT]="None")>100 THEN . . . . In this case, both ResultLookup filters have same dimensions as parameters with OR operator in an IF function. For the same reasons as before, this will define new scope with [d/PRODUCT] and [d/TIME] dimensions. And it connected with "OR", it should return union of two results as shown in Table 40:

TABLE 40

| PRODUCT | TIME |
| --- | --- |
| 16 GB | 201801 |
| 16 GB | 201802 |
| 32 GB | 201801 |
| 64 GB | 201802 |
| 32 GB | 201802 |

Some embodiments described herein may provide for subset granularity. For example, IF ResultLookup([d/ACCOUNT]="Price", [d/PLANT]="#", [d/AUDIT]="None") >10 AND ResultLookup([d/ACCOUNT]="Quantity", [d/AUDIT]="Manual")>1000 THEN . . . . In this case, one of the ResultLookup filters will return subset dimensions of another ResultLookup result. First ResultLookup will define [d/PRODUCT] and [d/TIME] dimensions filter and second ResultLookup will define [d/PRODUCT], [d/TIME] and [d/PLANT] dimensions filter.

Table 41 shown the result of the first ResultLookup:

TABLE 41

| PRODUCT | TIME |
| --- | --- |
| 16 GB | 201801 |
| 32 GB | 201802 |

Table 42 shows the result of the second ResultLookup:

TABLE 42

| PLANT | TIME | PRODUCT |
| --- | --- | --- |
| PLT01 | 201801 | 16 GB |
| PLT03 | 201801 | 32 GB |
| PLT01 | 201802 | 64 GB |

Both conditions connected with "AND", it should return valid scope with [d/PLANT], [d/TIME] and [d/PRODUCT] fields like below. That is, an (Inner Join) as shown in Table 43:

TABLE 43

| PLANT | TIME | PRODUCT |
| --- | --- | --- |
| PLT01 | 201801 | 16 GB |

Now consider:

MEMBERSET [d/PLANT] = ("PLT01", "PLT02", "PLT03")
IF ResultLookup([d/ACCOUNT]="Price", [d/PLANT]="#", [d/AUDIT]="None") > 10 OR
ResultLookup([d/ACCOUNT]="Quantity", [d/AUDIT]="Manual") > 1000 THEN Note the OR operator between two ResultLookup filter an IF function. Table 44 shows the result of the first ResultLookup:

TABLE 44

| PRODUCT | TIME |
| --- | --- |
| 16 GB | 201801 |
| 32 GB | 201802 |

Table 45 shows the result of the second ResultLookup:

TABLE 45

| PLANT | TIME | PRODUCT |
| --- | --- | --- |
| PLT01 | 201801 | 16 GB |
| PLT03 | 201801 | 32 GB |
| PLT01 | 201802 | 64 GB |

Because of multiple ResultLookup filters, all results should be combined with same granularity. Even the result of first ResultLookup has only [d/PRODUCT] and [d/TIME], it has also separate [d/PLANT] dimension scope already. Table 46 shows the scope of [d/PLANT] dimension:

TABLE 46

| PLANT |
| --- |
| PLT01 |
| PLT02 |
| PLT03 |

Then, the result of first ResultLookup will be modified to have same granularity with second result which has [d/PLANT], [d/TIME] and [d/PRODUCT]. The first result could be modified like below using [d/PRODUCT] scope as shown in Table 47:

TABLE 47

| PRODUCT | TIME | PRODUCT |
| --- | --- | --- |
| 16 GB | 201801 | PLT01 |
|  |  | PLT02 |
|  |  | PLT03 |
| 32 GB | 201802 | PLT01 |
|  |  | PLT02 |
|  |  | PLT03 |

The final calculation scope by the IF condition is to add both results as shown in Table 48:

TABLE 48

| PRODUCT | TIME | PLANT |
| --- | --- | --- |
| 16 GB | 201801 | PLT01 |
|  |  | PLT02 |
|  |  | PLT03 |
| 32 GB | 201802 | PLT01 |
|  |  | PLT02 |
|  |  | PLT03 |
| 32 GB | 201801 | PLT03 |
| 64 GB | 201802 | PLT01 |

Some embodiments may be associated with a partially overwrapped situation. Consider, for example: IF ResultLookup([d/ACCOUNT]="Price", [d/Product]="16 GB", [d/AUDIT]="None")>10 AND ResultLookup([d/ACCOUNT]="Quantity", [d/Plant]="PLT01", [d/AUDIT]= "Manual")>1000 THEN . . . . Here it is also possible to have partially overwrapped granularity between results of multiple ResultLookup. In this example, result (calculation scope) of first ResultLookup will have [d/PLANT] and [d/TIME] dimensions and second result will have [d/PRODUCT] and [d/TIME]. "AND" operator is between two conditions and only [d/TIME] dimension is common one. Table 49 illustrates the result of the first ResultLookup:

TABLE 49

| PLANT | TIME |
|---|---|
| PLT01 | 201801 |
| PLT02 | 201802 |

Table 50 shows the result of the second ResultLookup:

TABLE 50

| PRODUCT | TIME |
|---|---|
| 16 GB | 201801 |
| 32 GB | 201801 |

To have same granularity for both results, the system may do an "inner join" with common dimension ([d/TIME]) and set fields with rest dimensions ([d/PLANT] in first and [d/PRODUCT] in second) as illustrated in Table 51:

TABLE 51

| PLANT | TIME | PRODUCT |
|---|---|---|
| PLT01 | 201801 | 16 GB |
| PLT01 | 201801 | 32 GB |

Now consider the following:

```
MEMBERSET [d/PRODUCT] = ("16GB", "32GB", "64GB")
MEMBERSET [d/PLANT] = ("PLT01", "PLT02", "PLT03")
IF ResultLookup([d/ACCOUNT]="Price", [d/Product]="16GB",
[d/AUDIT]="None") > 10 OR
ResultLookup([d/ACCOUNT]="Quantity", [d/Plant]="PLT01",
[d/AUDIT]="Manual") > 1000
THEN// same with above example but with "OR" not "AND".
```

Table 52 shows the result of the first ResultLookup:

TABLE 52

| PLANT | TIME |
|---|---|
| PLT01 | 201801 |
| PLT02 | 201802 |

Table 53 shows the result of the second ResultLookup:

TABLE 53

| PRODUCT | TIME |
|---|---|
| 16 GB | 201801 |
| 32 GB | 201801 |
| 64 GB | 201802 |

To have unified scope from two conditions in an IF function, both results should have same granularity. The meaning of lack of dimension in the calculation scope, lacked dimension would have original calculation scope. For example, first result scope doesn't have [d/PRODUCT] meanwhile second result has it as shown in Table 54:

TABLE 54

| PLANT | TIME |   | PRODUCT |
|---|---|---|---|
| PLT01 | 201801 | ✗ | 16 GB |
| PLT02 | 201802 |   | 32 GB |

TABLE 54-continued

| PLANT | TIME | PRODUCT |
|---|---|---|
|   |   | 64 GB |

Then, calculation scope of first condition (first Result-Lookup) would be transformed as shown in Table 55:

TABLE 55

| PLANT | TIME | PRODUCT |
|---|---|---|
| PLT01 | 201801 | 16 GB |
|   |   | 32 GB |
|   |   | 64 GB |
| PLT02 | 201802 | 16 GB |
|   |   | 32 GB |
|   |   | 64 GB |

The second result would be also transformed to have [d/PLANT] field as shown in Table 56:

TABLE 56

| PRODUCT | TIME |   | PLANT |
|---|---|---|---|
| 16 GB | 201801 | ✗ | PLT01 |
| 32 GB | 201801 |   | PLT02 |
| 64 GB | 201802 |   | PLT03 |

Table 57 is the result of second condition in the IF function:

TABLE 57

| PRODUCT | TIME | PLANT |
|---|---|---|
| 16 GB | 201801 | PLT01 |
|   |   | PLT02 |
|   |   | PLT03 |
| 32 GB | 201801 | PLT01 |
|   |   | PLT02 |
|   |   | PLT03 |
| 64 GB | 201802 | PLT01 |
|   |   | PLT02 |
|   |   | PLT03 |

Note that the final calculation scope shown in Table 57 is a union of above two result scopes.

Some embodiments may provide for a comparison of cell values. For example:

```
IF ResultLookup([d/ACCOUNT]="Price1", [d/PLANT]="#",
[d/AUDIT]="None") >
ResultLookup([d/ACCOUNT]="Price2", [d/PLANT]="#",
[d/AUDIT]="None") THEN
```

This example is to filter calculation scope by comparing cell values. Regarding dimensionality of parameters of Result-Lookup, there are several cases like previous examples like same, subset and partially overwrapped. It is about mapping two results to compare each cell value (SIGNEDDATA) and getting valid scope based on given condition. Regarding mapping two results, the method of mapping is exactly same with the way that was used in calculation with multiple ResultLookups. Also note that granularity of scope table from the condition would have all dimensions which participated as Dynamic in both ResultLookup or Dynamic+Fixed. The dimensions participated as fixed one in both ResultLookups won't be changed from original calculation scope.

Some embodiments of advanced formulas may be associated with attributes. Consider, for example:

```
MEMBERSET [d/ACCOUNT] = ("Depreciation", "Account_Receivable", "Account_Payable")
IF ResultLookup([d/ACCOUNT] ="OPERATOR", [d/AUDIT] =[d/ACCOUNT].[p/CF_METHOD],
[d/PLANT] ="#", [d/PRODUCT] ="#") <> 0 THEN
```

According to the rule for Dynamic & Fixed dimensions, [d/TIME] is dynamic which is valid dimension as a result of IF condition. Table 58 is the result of above ResultLookup. [d/ACCOUNT] is fixed "OPERATOR" and [d/AUDIT] is overwritten by [p/CF_METHOD] property from the given [d/ACCOUNT] scope:

TABLE 58

| ACCOUNT | PLANT | AUDIT | PRODUCT | TIME | SIGNEDDATA |
|---|---|---|---|---|---|
| OPERATOR | # | PLUS | # | 201801 | 1 |
| OPERATOR | # | MINUS | # | 201801 | −1 |

As shown in Table 59, [d/ACCOUNT] master data and all three [d/ACCOUNT] members in the MEMBERSET are valid for the IF condition.

TABLE 59

| ACCOUNT ID | CF_ACCOUNT | CF_METHOD |
|---|---|---|
| Depreciation | CF_Depreciation | PLUS |
| Account_Receivable | CF_AR | MINUS |
| Account_Payable | CF_AP | PLUS |

Then, the scope of IF condition would be [d/TIME] and [d/ACCOUNT] which are dynamic dimensions in the ResultLookup of IF function is shown in Table 60:

TABLE 60

| ACCOUNT | TIME |
|---|---|
| Depreciation | 201801 |
| Account_Receivable | 201801 |
| Account_Payable | 201801 |

Some embodiments may provide for advanced use cases with Attribute and TIME function. For example, there are several cases in attribute use case for the scope (and condition):

```
MEMBERSET [d/TIME]= [d/VERSION].[p/BEGINPERIOD] TO
[d/VERSION].[p/CLOSINGPERIOD]
    FILTER_MEMBERSET [d/ACCOUNT].[p/ACCTYPE] =
    ("AST", "LEQ")
    IF [d/ACCOUNT].[p/ACCTYPE] = ("INC", "EXP") THEN
```

In some embodiments, there is no scope transferred to the Planning Script. In other words, planning script will work on entire analytic cloud model as long as it is defined in the script with MEMBERSET or FILTER_MEMBERSET. Note that ADD_MEMBERSET might not make sense since all members are in the scope then no member can be added. In some embodiments, there is no scope transferred to the planning script. It means no current context conception for the script. [d/TIME] can define the scope with range by using "TO" instruction (Ex. MEMBERSET [d/TIME]= "201801" TO "201812").

Basically, if there is no left of "TO" which is starting period (e.g., MEMBERSET [d/TIME]=TO "201812"), it means earliest period of transferred [d/TIME] member set is starting point. If there is no right of "TO" which is ending period (Ex. MEMBERSET [d/TIME]="201801" TO, it means ending point is the last period of transferred Time member set. In some embodiments, there is no transferred [d/TIME] member set, if no left of "TO", starting point would be earliest period of analytic cloud model and vice versa. The scope for each axis (dimension) will have member ID list. This means that whatever condition is following MEMBERSET instruction, it should return member ID list only.

There should be scope tables for each dimension from beginning of the planning script. With MEMBERSET <dimension>=<member list>, the planning script will overwrite member list in the scope table with MEMBERSET definition. For example, MEMBERSET <dimension>.<Attribute>=<attribute value> will overwrite member list in the scope table by filtering all members in a dimension with the attribute value. FILTER_MEMBERSET <dimension>.<Attribute>=<attribute value> will filter member list in the scope table by filtering existing member list in <dimension> scope table by the attribute value. With respect to an "IF condition with the attribute of the dimension," it may be the same as with FILTER_MEMBERSET for the planning script (e.g., it will filter <dimension> scope table using attribute value).

Some embodiments may provide for an IF condition with RESULTLOOKUP with attributes. For example, consider:

```
IF ResultLookup([d/ACCOUNT] ="Quantity",
    [d/PLANT] =[d/PRODUCT].[p/PLANT]) > 0 THEN
IF ResultLookup([d/ACCOUNT] ="Quantity",
    [d/PLANT] =[d/PLANT].[p/LinkedPLANT]) > 0
    THEN
```

The first example above is referring other dimension's attribute. The second one is referring own attribute. IF condition will treat scope tables at the end.

```
IF ResultLookup([d/ACCOUNT]="Quantity",[d/
    PLANT]=[d/PRODUCT].[p/PLANT])>0 THEN
```

Before this "IF" instruction, there are five scope tables for five dimensions. [d/PLANT] scope table has ("#","PLT01", "PLT02") and [d/PRODUCT] scope table has ("16 GB", "32 GB", "64 GB") as an example. And its [p/PLANT] attribute values of the [d/PRODUCT] dimension are shown in Table 61:

TABLE 61

| PRODUCT ID | PLANT |
|---|---|
| 16 GB | PLT01 |
| 32 GB | PLT01 |
| 64 GB | PLT01 |

By the "ResultLookup" condition in the "IF" instruction, it will get cell values based on the scope and ResultLookup's parameter in case its value is greater than zero. Below is the result of ResultLookup in case its value is greater than zero. Below are cell values which fit the condition (greater than zero) as shown in Table 62:

TABLE 62

| ACCOUNT | PLANT | AUDIT | PRODUCT | TIME | SIGNEDDATA |
|---|---|---|---|---|---|
| QUANTITY | PLT01 | None | 16 GB | 201801 | 100 |
| QUANTITY | PLT01 | None | 32 GB | 201801 | 200 |
| QUANTITY | PLT01 | None | 16 GB | 201802 | 110 |

This result will impact dimensions which are not in the ResultLookup as parameters. In other words, this "IF" instruction won't impact the scopes of [d/ACCOUNT], [d/PLANT] which are used as parameters in the ResultLookup at all. The scope of [d/AUDIT], [d/PRODUCT] and [d/TIME] will be overwritten like below as one merged table to keep combinations as shown in Table 63:

TABLE 63

| AUDIT | PRODUCT | TIME |
|---|---|---|
| None | 16 GB | 201801 |
| None | 32 GB | 201801 |
| None | 16 GB | 201802 |

The scope of [d/PLANT] remains still ("#", "PLT01", "PLT02"). And [d/ACCOUNT] scope won't be changed by this condition.

IF ResultLookup([d/ACCOUNT]="Quantity",[d/PLANT]=[d/PLANT].[p/LinkedPLANT])>0 THEN As a same manner with above, [d/PLANT].[p/Linked-PLANT] will overwrite [d/PLANT] scope table for the ResultLookup operation. And the result of ResultLookup will impact rest dimensions scope tables, [d/AUDIT], [d/PRODUCT] and [d/TIME]. There is no change in [d/ACCOUNT], [d/PLANT] scope tables. This behavior is same with the case referring other dimension's attribute which is referred in previous example as shown in Table 65:

TABLE 65

| PLANT ID # | LinkedPLANT # |
|---|---|
| PLT01 | PLT001 |
| PLT02 | PLT005 |

Table 65 shows the result of the ResultLookup condition:

TABLE 65

| ACCOUNT | PLANT | AUDIT | PRODUCT | TIME | SIGNEDDATA |
|---|---|---|---|---|---|
| QUANTITY | PLT001 | None | 16 GB | 201801 | 100 |
| QUANTITY | PLT001 | None | 32 GB | 201801 | 200 |

The scope of [d/AUDIT], [d/PRODUCT] and [d/TIME] will be as illustrated in Table 66 as combination of three dimensions:

TABLE 66

| AUDIT | PRODUCT | TIME |
|---|---|---|
| None | 16 GB | 201801 |
| None | 32 GB | 201801 |

Consider:

IF ResultLookup([d/ACCOUNT]="Price", [d/TIME]=PREVIOUS(1))>0 THEN

This will filter the scope tables of [d/AUDIT], [d/PLANT] and [d/PRODUCT] dimensions by checking previous period's "Price" value. This example is for TIME function. But there is no difference with above examples. [d/TIME] scope tables will not be changed after this "IF" instruction. Only [d/PLANT], [d/AUDIT] and [d/PRODUCT] scope tables will be changed by the result of ResultLookup in the "IF" instruction block (block is from IF to ENDIF or ELSEIF). [d/TIME] dimension has 3 members ("201801", "201802", "201803") in the scope table as shown in Table 67:

TABLE 67

| TIME ID | PREVIOUS |
|---|---|
| 201801 | 201712 |
| 201802 | 201801 |
| 201803 | 201802 |

Table 63 shows the result of ResultLookup condition

TABLE 68

| ACCOUNT | PLANT | AUDIT | PRODUCT | TIME | SIGNEDDATA |
|---|---|---|---|---|---|
| PRICE | PLT001 | None | 64 GB | 201712 | 100 |
| PRICE | PLT001 | None | 32 GB | 201801 | 200 |

Then the scope of [d/PLANT], [d/AUDIT] and [d/PRODUCT] will be as shown in Table 69 (and there is no change in [d/ACCOUNT], [d/TIME] dimensions):

TABLE 69

| PLANT | AUDIT | PRODUCT |
|---|---|---|
| PLT001 | None | 64 GB |
| PLT001 | None | 32 GB |

Because of cell value filter, calculation scope might not be treated as a regular cube structure. Calculation scope could be defined by combination of multi dimensions. It brings changes on data reading and calculation scope handling method with IF and FOREACH which are inside of scattered calculation scope. Before scattered calculation scope, scope was controlled by each dimension's member list like Table 70:

TABLE 70

| Account ID | Plant ID | Product ID | Audit ID | Time ID |
|---|---|---|---|---|
| Price | # | 16 GB | None | 201801 |
| Quantity | PLT01 | 32 GB | Manual | 201802 |
| Revenue | PLT02 | 64 GB | Adjustment | 201803 |
| Tax | | | CONSOL | |
| Sales | | | | |
| Ext Sales | | | | |
| Interest | | | | |

And if there is cell value filter, the calculation scope will be changed to have combination of multiple dimensions as shown in Table 71:

```
IF ResultLookup([d/ACCOUNT] ="LOSSRATIO",
    [d/PRODUCT] ="#") > 10 THEN
    Data([d/ACCOUNT] ="PRODUCTION") =
    ResultLookup([d/ACCOUNT] ="PRODUCTION") -
    ResultLookup([d/ACCOUNT] ="LOSSRATIO",
    [d/PRODUCT] ="#") *
    ResultLookup([d/ACCOUNT] ="Quantity")
ENDIF
```

TABLE 71

| Account ID | Product ID | Plant Plant.ID | Audit Audit.ID | Time Time.ID |
|---|---|---|---|---|
| Price | 16 GB | PLT01 | None | 201801 |
| Quantity | 32 GB | PLT01 | Manual | 201801 |
| Revenue | 64 GB | PLT01 | None | 201802 |
| Tax | | PLT01 | CONSOL | 201802 |
| Sales | | PLT01 | Adjustment | 201802 |
| Ext Sales | | PLT02 | Manual | 201801 |
| Interest | | PLT02 | None | 201802 |
| | | PLT02 | None | 201803 |
| | | PLT02 | Adjustment | 201802 |

Then, ResultLookup function with above calculation scope should recognize combination fully not individual member ID.

Consider:

```
IF ResultLookup([d/ACCOUNT] ="LOSSRATIO",
    [d/PRODUCT] ="#") > 10 THEN
    IF ResultLookup([d/ACCOUNT] ="Price",
        [d/PLANT] ="#") > 100 THEN
        Data([d/ACCOUNT] ="PRODUCTION") =
        ResultLookup([d/ACCOUNT] ="PRODUCTION") -
        ResultLookup([d/ACCOUNT] ="LOSSRATIO",
        [d/PRODUCT] ="#") *
        ResultLookup([d/ACCOUNT] ="Quantity")
    ENDIF
ENDIF
```

Here, the second IF that has cell value filter in blue should work on calculation scope which consists of 3 scope tables. And its expected calculation scope would have 3 fields [d/PRODUCT], [d/AUDIT] and [d/TIME], if there was no previous cell value filter. In other words, if there is no multi-dimensional scope table, a calculation scope will have 3 dimensions [d/PRODUCT], [d/AUDIT] and [d/TIME].

However, because there is a multi-dimensional scope table which has tuple base scope, the expected result of second cell value filter in another IF would be impacted. And the result should not have any calculation scope which was excluded in previous cell value filter.

Table 72 shows (in the Product, Plant, Audit, and Time columns) a result of second ResultLookup based on the calculation scope from first ResultLookup. To keep the calculation scope from first cell value filter, the number of calculation scope table should be two, one has only [d/ACCOUNT] member list and another scope table should have rest 4 dimension's member list with combination.

TABLE 72

| Account | Product | Plant | Audit | Time | Signed Data |
|---|---|---|---|---|---|
| Price | 16 GB | # | None | 201801 | 111 |
| Price | 16 GB | # | Manual | 201801 | 120 |
| Price | 16 GB | # | None | 201802 | 111 |
| Price | 32 GB | # | Manual | 201801 | 180 |
| Price | 32 GB | # | None | 201802 | 190 |
| Price | 64 GB | # | Manual | 201801 | 250 |
| Price | 64 GB | # | None | 201802 | 255 |
| Price | 64 Gb | # | None | 201803 | 300 |
| Price | 64 GB | # | Adjustment | 201802 | 150 |

Note that [d/PLANT] has only "a" member because of cell value filter definition not like original calculation scope. It is not enough to collect calculation scope with 4 dimensions. And "#" is already out of calculation scope in [d/PLANT] dimension. Therefore, to get calculation scope with [d/PLANT] dimension, above result of the ResultLookup should keep original member ID of [d/PLANT] dimension which was overwritten by "#" as shown by the Plant and Plant.ID columns in Table 73:

TABLE 73

| Account | Product | Plant | Plant.ID | Audit.ID | Time.ID | SignedData |
|---|---|---|---|---|---|---|
| Price | 16 GB | # | PLT01 | None | 201801 | 101 |
| Price | 16 GB | # | PLT01 | Manual | 201801 | 120 |
| Price | 16 GB | # | PLT02 | Manual | 201801 | 120 |
| Price | 16 GB | # | PLT01 | None | 201802 | 111 |
| Price | 16 GB | # | PLT02 | None | 201802 | 111 |
| Price | 32 GB | # | PLT01 | Manual | 201801 | 180 |
| Price | 32 GB | # | PLT02 | Manual | 201801 | 180 |
| Price | 32 GB | # | PLT01 | None | 201802 | 190 |
| Price | 32 GB | # | PLT02 | None | 201802 | 190 |
| Price | 64 GB | # | PLT01 | Manual | 201801 | 250 |
| Price | 64 GB | # | PLT02 | Manual | 201801 | 250 |
| Price | 64 GB | # | PLT01 | None | 201802 | 255 |
| Price | 64 GB | # | PLT02 | None | 201802 | 255 |
| Price | 64 GB | # | PLT02 | None | 201803 | 300 |
| Price | 64 GB | # | PLT01 | Adjustment | 201802 | 150 |
| Price | 64 GB | # | PLT02 | Adjustment | 201802 | 150 |

Then, the final calculation scope after two cell value filter would be below two scope tables shown in Table 74 (emphasizing the first to rows of the table):

TABLE 74

| Account ID | Product PRODUCT.ID | Plant Plant.ID | Audit Audit.ID | Time Time.ID |
|---|---|---|---|---|
| Price | 16 GB | PLT01 | None | 201801 |
| Quantity | 16 GB | PLT01 | Manual | 201801 |
| Revenue | 16 GB | PLT02 | Manual | 201801 |
| Tax | 16 GB | PLT01 | None | 201802 |
| Sales | 16 GB | PLT02 | None | 201802 |
| Ext Sales | 32 GB | PLT01 | Manual | 201801 |
| Interest | 32 GB | PLT02 | Manual | 201801 |
| | 32 GB | PLT01 | None | 201802 |
| | 32 GB | PLT02 | None | 201802 |
| | 64 GB | PLT01 | Manual | 201801 |
| | 64 GB | PLT02 | Manual | 201801 |
| | 64 GB | PLT01 | None | 201802 |
| | 64 GB | PLT02 | None | 201802 |
| | 64 GB | PLT02 | None | 201803 |
| | 64 GB | PLT01 | Adjustment | 201802 |
| | 64 GB | PLT02 | Adjustment | 201802 |

Consider:

```
IF ResultLookup([d/ACCOUNT] ="LOSSRATIO",
    [d/PRODUCT] ="#") > 10 THEN
    FOREACH [d/PLANT], [d/TIME]
        Data([d/ACCOUNT] ="PRODUCTION") =
        ResultLookup([d/ACCOUNT] ="PRODUCTION") -
        ResultLookup([d/ACCOUNT] ="LOSSRATIO",
        [d/PRODUCT] ="#") *
        ResultLookup([d/ACCOUNT] ="Quantity")
    ENDFOR
ENDIF
```

Here, the scope table with multiple dimensions would impact FOREACH function either. In above example, IF function which is before FOREACH function made calculation scope as shown in Table 75.

TABLE 75

| Account ID | Product ID | Plant Plant.ID | Audit Audit.ID | Time Time.ID |
|---|---|---|---|---|
| Price | 16 GB | PLT01 | None | 201801 |
| Quantity | 32 GB | PLT01 | Manual | 201801 |
| Revenue | 64 GB | PLT01 | None | 201802 |
| Tax | | PLT01 | CONSOL | 201802 |
| Sales | | PLT01 | Adjustment | 201802 |
| Ext Sales | | PLT02 | Manual | 201801 |
| Interest | | PLT02 | None | 201802 |
| | | PLT02 | None | 201803 |
| | | PLT02 | Adjustment | 201802 |

Figure 14:
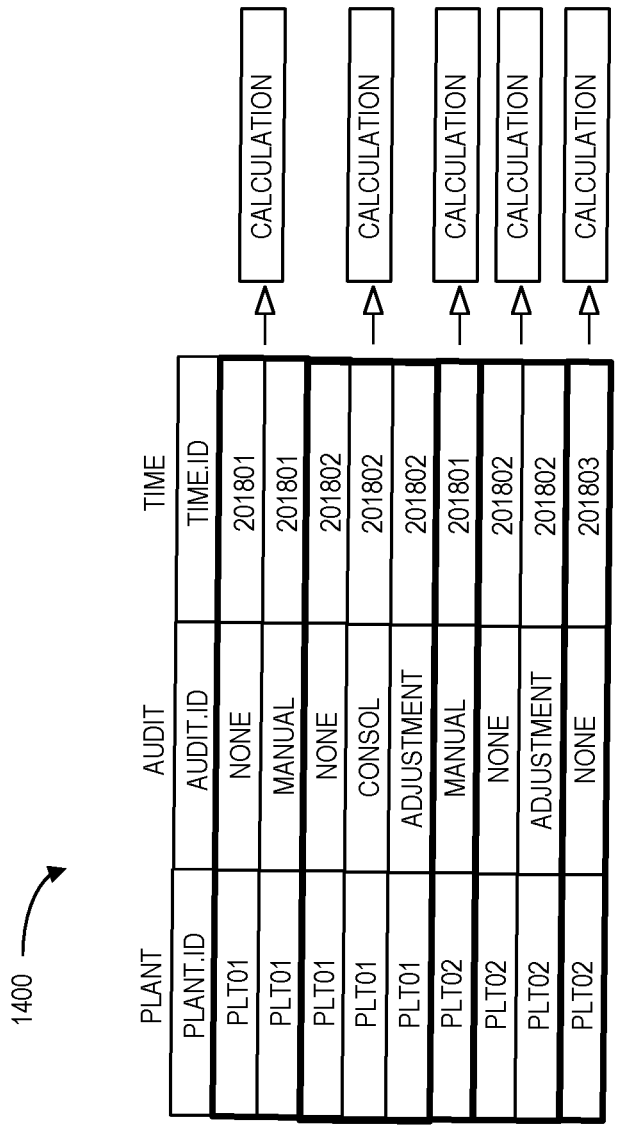
FIGS. 14 and 15 illustrate execution of a for each instruction in accordance with some embodiments.

And, FOREACH function has [d/PLANT] and [d/TIME] dimensions as parameter and both dimensions are in same scope table. FOREACH function works as "group by" with [d/PLANT] and [d/TIME] combination technically. Then, the loop 1400 will be executed five times as indicated by bold blocks in FIG. 14.

If the dimensions in the FOREACH function are [d/PRODUCT] and [d/PLANT], the loop logic should adjust calculation scope table to add [d/PRODUCT] dimension to keep combination.

```
IF ResultLookup([d/ACCOUNT] ="LOSSRATIO",
    [d/PRODUCT] ="#") > 10 THEN
    FOREACH [d/PRODUCT], [d/PLANT]
        Data([d/ACCOUNT] ="PRODUCTION") =
        ResultLookup([d/ACCOUNT] ="PRODUCTION") -
        ResultLookup([d/ACCOUNT] ="LOSSRATIO",
        [d/PRODUCT] ="#") *
        ResultLookup([d/ACCOUNT] ="Quantity")
    ENDFOR
ENDIF
```

Figure 15:
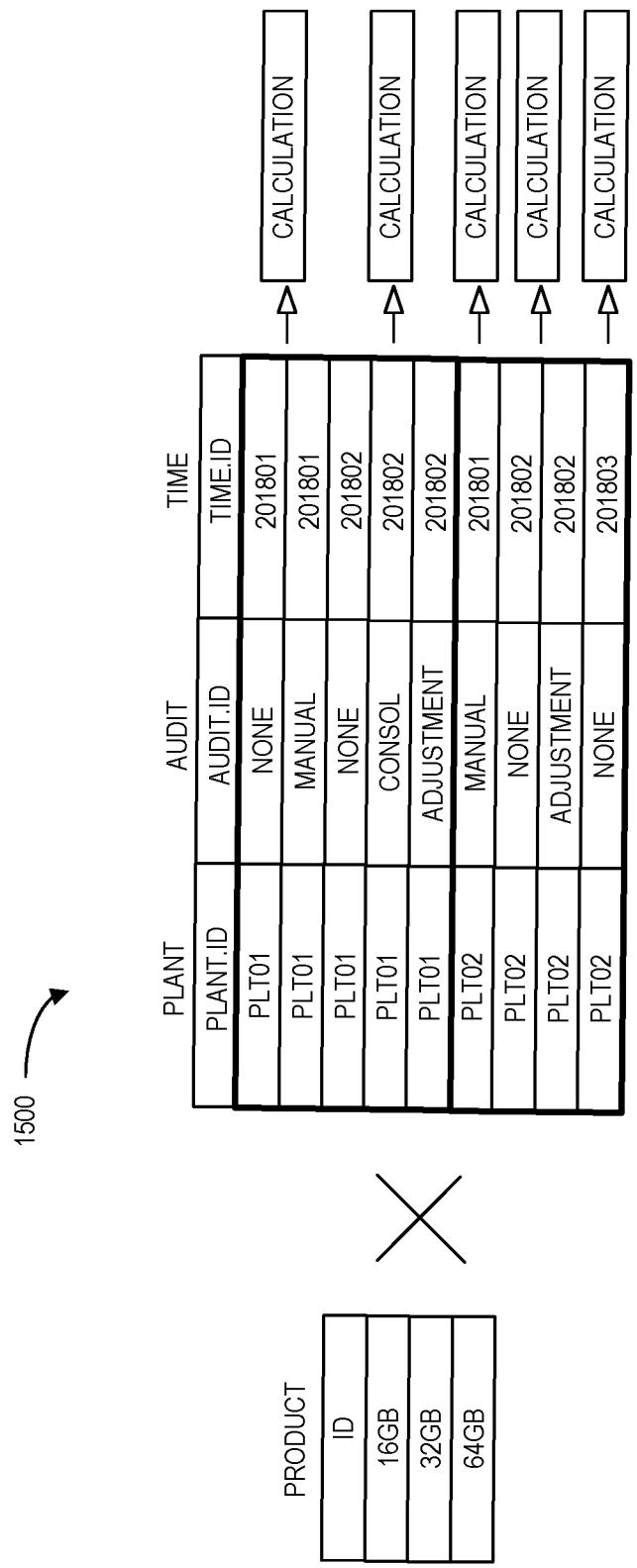

There will be six calculations by the loop because [d/PRODUCT] dimension has 3 members and [d/PLANT] has 2 members in the calculation scope. To keep the valid combination, the calculation should run on 4 dimensions' combination. Then the calculation scope table with three fields that was created by first cell value filter will be extended in FOREACH function to have [d/PRODUCT] semantically as shown 1500 in FIG. 15.

There are various calculations necessity with TIME shift. Representatively, the carry-forward requires calculations between different periods.

```
//Initiate PLAN data with average of recent two years.
IF [d/CATEGORY] ="ACTUAL" THEN
    Data([d/CATEGORY] ="Plan") =
    (ResultLookup([d/TIME] =Previous(12)) +
    ResultLookup([d/Time] =Previous(24)))/2
ENDIF
//Calculate current period delta value by this period's closing minus
previous period's closing
Data([d/FLOW] ="DELTA") =
ResultLookup([d/FLOW] ="CLOSING") -
ResultLookup([d/FLOW] ="CLOSING", [d/TIME] =PREVIOUS(1))
//Calculate next period delta value by next period's closing minus this
period's closing.
Data([d/FLOW] ="DELTA", [d/TIME] =NEXT(1)) =
ResultLookup([d/FLOW] ="CLOSING",
[d/TIME] =NEXT(1)) - ResultLookup([d/FLOW] ="CLOSING")
```

Figure 16:
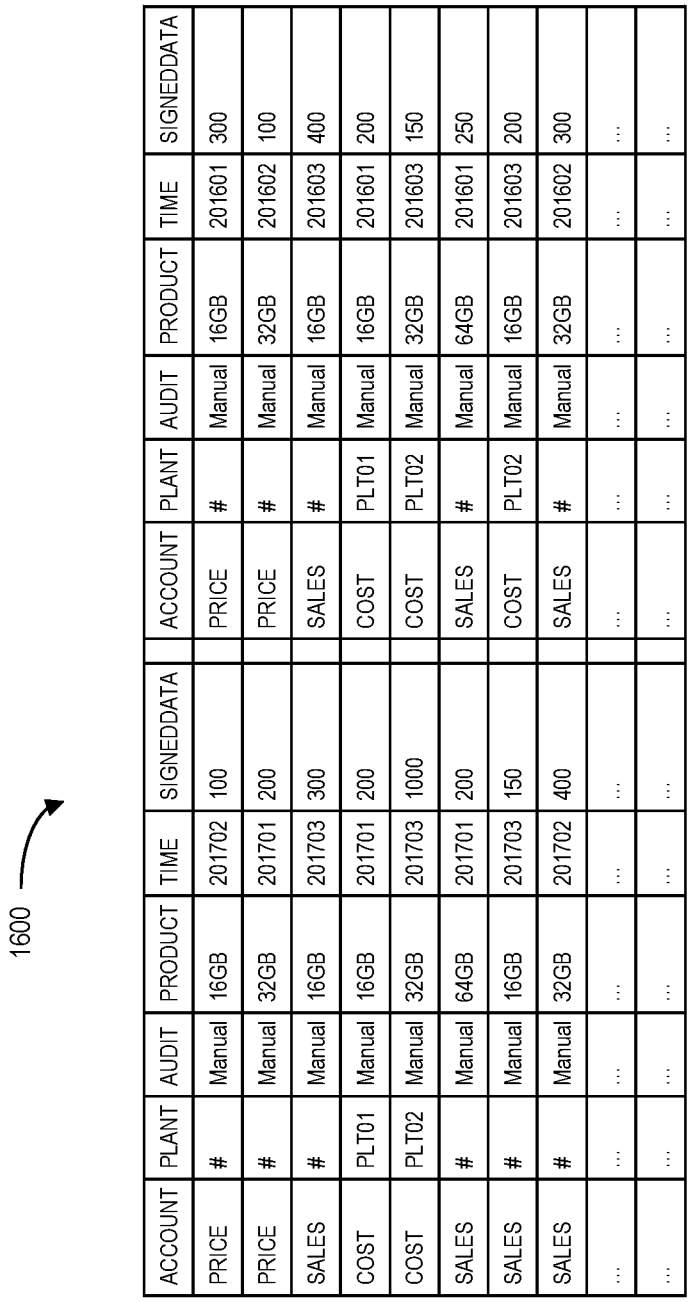

Note that:

```
MEMBERSET [d/TIME] = ("201801", "201802", "201803")
Data([d/CATEGORY] ="Plan") =
(ResultLookup([d/TIME] =Previous(12)) +
ResultLookup([d/Time] =Previous(24)))/2
``` will calculate 2018 Q1 PLAN data by averaging recent two years data. FIG. 16 shows 1600 that two ResultLookups will return two record lists.

Figure 18:
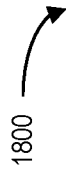

To calculate average of two record list, it requires mapping. But, with above two result lists, script logic cannot map each record respectively. Then, each record list should keep original TIME member which was parameter of TIME function as shown 1700 in FIG. 17. Then, both record lists would be merged like below technically and finalize new SIGNEDDATA before handover calculation to "Data" instruction as shown 1800 in FIG. 18.

Consider:

```
IF [d/ACCOUNT].[p/CALCTYPE] = "CashFlow" THEN
    DATA([d/ACCOUNT] = [d/ACCOUNT].[p/CF ACCOUNT],
    [d/AUDIT] ="CF_CALC", [d/PLANT] ="#",
    [d/PRODUCT] ="#") =
    ResultLookup([d/ACCOUNT] ="OPERATOR",
    [d/AUDIT] =[p/ACCOUNT].[p/CF_METHOD],
    [d/PLANT] ="#", [d/PRODUCT] ="#") *
    ResultLookup( )
ENDIF
```

This example is to transfer Account values to new Account members which is in its [p/CALCTYPE] attribute. And operator should be multiplied. The [d/ACCOUNT] scope was filtered by [p/CALCTYPE] attribute values in "IF" instruction. The [d/ACCOUNT] scope table contains 5 members originally. And by the [p/CALCTYPE] property filter, [d/ACCOUNT] scope table will have only two members as shown in Tables 76 and 77:

TABLE 76

| ID | CALCTYPE |
|---|---|
| PRICE | |
| QUANTITY | |
| COGS | |
| Depreciation | CashFlow |
| Account_Receivable | CashFlow |
| Account_Payable | CashFlow |

TABLE 77

| ACCOUNT ID | CFACCOUNT | CF_METHOD |
|---|---|---|
| Depreciation | CF_Depreciation | PLUS |
| Account_Receivable | CF_AR | MINUS |
| Account_Payable | CF_AP | PLUS |

Table 78 shows the first ResultLookup returns record list because [d/AUDIT] dimension scope table will be overwritten by [p/CF_METHOD] attribute values of the [d/ACCOUNT] scope table.

TABLE 78

| ACCOUNT | PLANT | AUDIT | PRODUCT | TIME | SIGNEDDATA |
|---|---|---|---|---|---|
| OPERATOR | # | PLUS | # | 201801 | 1 |
| OPERATOR | # | MINUS | # | 201801 | −1 |

Table 79 shows the record list returned by the second ResultLookup.

TABLE 79

| ACCOUNT | PLANT | AUDIT | PRODUCT | TIME | SIGNEDDATA |
|---|---|---|---|---|---|
| Depreciation | PLT01 | Manual | # | 201801 | 3000 |
| Depreciation | PLT02 | Manual | # | 201801 | 2000 |
| Account_Receivable | PLT01 | PLUS | 16 GB | 201801 | 5000 |
| Account_Receivable | PLT02 | MINUS | 32 GB | 201801 | 6000 |
| Account_Payable | PLT01 | PLUS | 16 GB | 201801 | 3000 |

To do calculation with two record lists, script logic matches both by original POV. Here is the record list of first ResultLookup with original POV. [d/ACCOUNT], [d/PLANT] and [d/PRODUCT] dimensions were overwritten by fixed members and [d/AUDIT] dimension has various members but it was also overwritten by [p/CF_METHOD] Attribute value of [d/ACCOUNT] dimension. There is no [d/TIME] dimension parameter in both ResultLookups. Then [d/TIME] dimension is a key field obviously to map both record lists. And even [d/ACCOUNT] dimension was overwritten by fixed member "OPERATOR", [d/ACCOUNT] worked as member list in [d/AUDIT] dimension, [d/ACCOUNT] member of [d/AUDIT] field is also a key field to map both record lists.

For mapping both ResultLookups, [d/ACCOUNT] members for [d/AUDIT] in the first ResultLookup should be used. Then result of the first ResultLookup should be like shown in Table 80:

TABLE 80

| ACCOUNT | PLANT | ACCOUNT of AUDIT | AUDIT | PRODUCT | TIME | SIGNEDDATA |
|---|---|---|---|---|---|---|
| OPERATOR | # | Depreciation | PLUS | # | 201801 | 1 |
| OPERATOR | # | Account_Receivable | MINUS | # | 201801 | −1 |
| OPERATOR | # | Account_Payable | PLUS | # | 201801 | 1 |

Figure 20:

Then, the key fields (dimensions) for mapping are [d/ACCOUNT] ([d/ACCOUNT] reference of [d/AUDIT]) and [d/TIME] which are various members as shown 1900 in FIG. 19. Calculation will be processed like shown 2000 in FIG. 20. [d/ACCOUNT], [d/TIME] were used as mapping keys. Then, by "Data" instruction's parameter, [d/ACCOUNT] member will be replaced with its attribute [p/CFACCOUNT] value and [d/AUDIT], [d/PLANT] and [d/PRODUCT] dimensions will be replaced with given parameters as well as shown in Table 81:

TABLE 81

| ACCOUNT | PLANT | AUDIT | PRODUCT | TIME | SIGNEDDATA |
|---|---|---|---|---|---|
| CF_Depreciation | # | CF_CALC | # | 201801 | 3000 |
| CF_Depreciation | # | CF_CALC | # | 201801 | 2000 |
| CF_AR | # | CF_CALC | # | 201801 | −5000 |
| CF_AR | # | CF_CALC | # | 201801 | −6000 |
| CF_AP | # | CF_CALC | # | 201801 | 3000 |

After aggregation happens, the final result of the script is shown in Table 81:

TABLE 81

| ACCOUNT | PLANT | AUDIT | PRODUCT | TIME | SIGNEDDATA |
|---|---|---|---|---|---|
| CF_Depreciation | # | CF_CALC | # | 201801 | 5000 |
| CF_AR | # | CF_CALC | # | 201801 | −11000 |
| CF_AP | # | CF_CALC | # | 201801 | 3000 |

Figure 21:
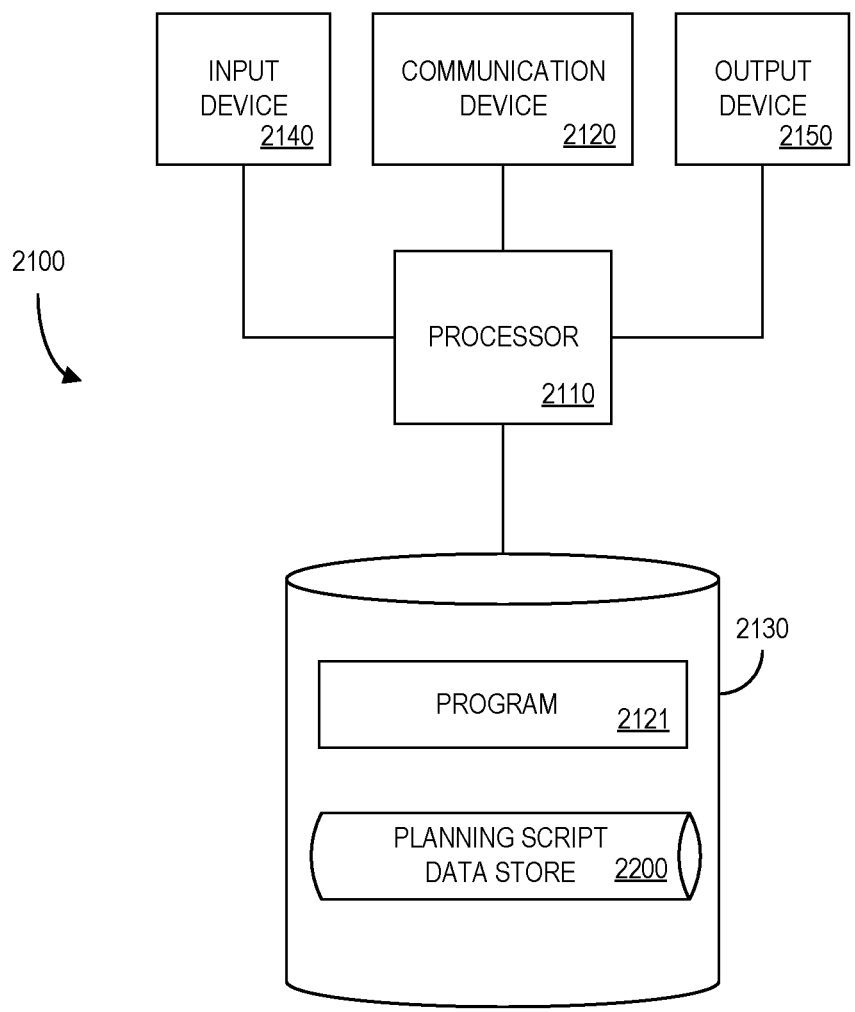
FIG. 21 is a high-level diagram of an apparatus or platform in accordance with some embodiments.

FIG. 21 is a block diagram of apparatus 2100 according to some embodiments. The apparatus 2100 may comprise a general-purpose computing apparatus and may execute program code to perform any of the functions described herein. The apparatus 2100 may include other unshown elements according to some embodiments. According to some embodiments, the apparatus 2100 includes a processor 2110 operatively coupled to a communication device 2120, a data storage device 2130, one or more input devices 2140, one or more output devices 2150, and/or a memory 2160. The communication device 2120 may facilitate communication with external devices, such as a reporting client or a data storage device. The input device(s) 2140 may comprise, for example, a keyboard, a keypad, a mouse or other pointing device, a microphone, knob or a switch, an Infra-Red ("IR") port, a docking station, and/or a touch screen. The input device(s) 2140 may be used, for example, to enter information into the apparatus 2100 (e.g., a planning script). The output device(s) 2150 may comprise, for example, a display (e.g., a display screen) a speaker, and/or a printer (e.g., to provide data manipulation results to a user, summary reports, troubleshooting information, etc.).

The data storage device 2130 may comprise any appropriate persistent storage device, including combinations of magnetic storage devices (e.g., magnetic tape, hard disk drives and flash memory), optical storage devices, Read Only Memory ("ROM") devices, etc., while the memory 2160 may comprise Random Access Memory ("RAM").

The program code 2132 may be executed by the processor 2110 to cause the apparatus 2100 to perform any one or more of the processes described herein. Embodiments are not limited to execution of these processes by a single apparatus. The data storage device 2130 may also store data and other program code for providing additional functionality and/or which are necessary for operation thereof, such as device drivers, Operating System ("OS") files, etc.

In some embodiments (such as shown in FIG. 21), the storage device 2130 further stores a planning script data store 2200. An example of a database that may be used in connection with the apparatus 2100 will now be described in detail with respect to FIG. 22. Note that the database described herein is only one example, and additional and/or different information may be stored therein. Moreover, various databases might be split or combined in accordance with any of the embodiments described herein.

Figure 22:
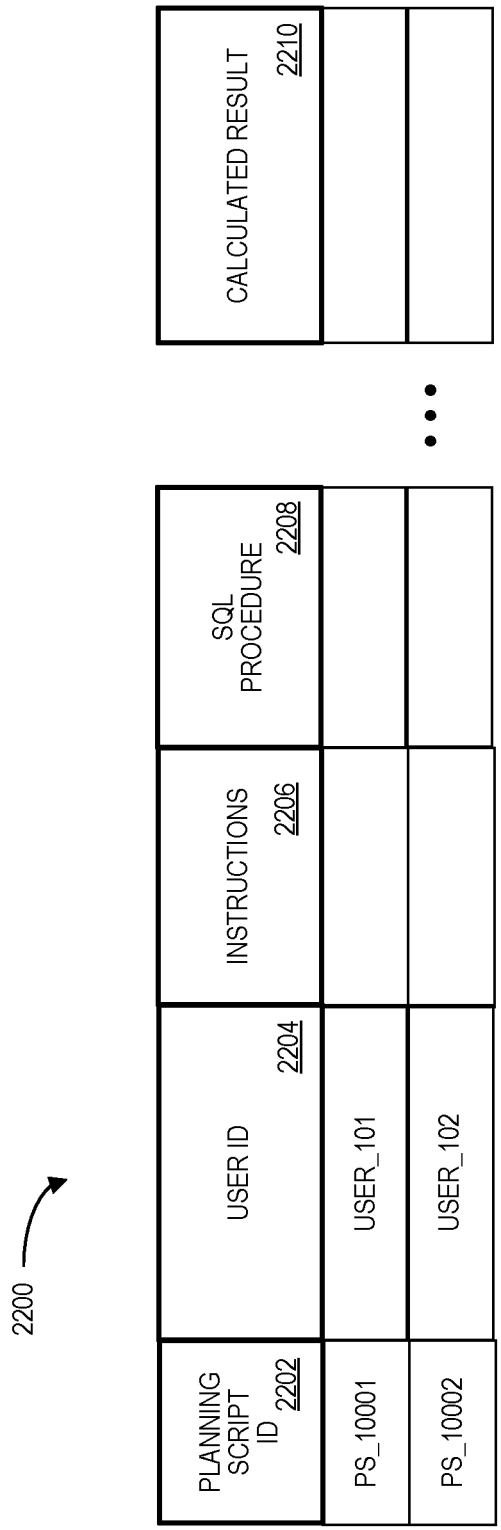
FIG. 22 is a portion of a planning script repository database according to some embodiments.

Referring to FIG. 22, a table is shown that represents the planning script data store 2200 that may be stored at the apparatus 21100 according to some embodiments. The table may include, for example, entries identifying advanced formulas that may be automatically converted to SQL procedures. The table may also define fields 2202, 2204, 2206, 2208, 2210 for each of the entries. The fields 2202, 2204, 2206, 2208, 2210 may, according to some embodiments, specify: a planning script identifier 2202, a user identifier 2204, instructions 2206, an SQL procedure 2208, and calculated results 2210. The planning script data store 2200 may be created and updated, for example, based on information received via a planning script user interface.

The planning script identifier 2202 may be, for example, a unique alphanumeric code identifying advanced formulas entered by a user associated with the user identifier 2204. The instructions 2206 might include a list of expressions, operators, etc. that make up the planning script. The SQL procedure 2208 might represent, for example, the code that was automatically generated by a conversion platform based on the instructions 2206. The calculate result 2210 may represent the result of execution of the SQL procedure 2208 on an analytics data cube.

Note that the planning script instructions 2206 might utilize a customize syntax to facilitate advanced formulas. For example, a "CONFIG.GENERATE_UNBOOKED_DATA" type instruction might generate a 0 value instead of unbooked data (empty value). For example, CONFIG.GENERATE_UNBOOKED_DATA=[OFF/ON] might, for OFF: if RESULTLOOKUP returns unbooked data (empty value), nothing happens. In other words, original data shouldn't be changed. For ON: if RESULTLOOKUP returns unbooked data (empty value), then 0 value should be generated.

According to some embodiments, a "CONFIG.TIME_HIERARCHY=FISCALYEAR" type instruction might be provided such that an advanced formula is calculated based on a fiscal year. For example:
CONFIG.TIME_HIERARCHY=FISCALYEAR
MEMBERSET [d/TIME]="201801"
  The scope will be 2018 P01.
MEMBERSET [d/TIME]=("201801", "201802", "201803")
  The scope will be 2018 P01, 2018 P02 and 2018 P03.
MEMBERSET [d/TIME]="201801" TO "201812"
  The scope will be 2018 P01 to 2018 P12.
MEMBERSET [d/TIME]=[d/VERSION].[p/BEGINNING] TO
  [d/VERSION]. [p/ENDING]
  If the value of BEGINNING is "201801" and ENDING is "201812", then the scope will be 2018 P01 to 2018 P01.
MEMBERSET [d/TIME]="201801"
  ADD_MEMBERSET [d/TIME]=NEXT( ) The scope will be 2018 P01 and 2018 P02.
RESULTLOOKUP([d/TIME]="201801")
  It returns data set of TIME=2018 P01
DATA ([d/TIME]="201801")=RESULTLOOKUP( )
  It generates data set in TIME=2018 P01

According to some embodiments, a "CONFIG.TIME_HIERARCHY=CALENDARYEAR" type instruction may provide that an advanced formula is calculated based on a calendar year. For example, CONFIG.TIME_HIERARCHY=CALENDARYEAR might:
MEMBERSET [d/TIME]="201801"
  The scope will be 2018 January
MEMBERSET [d/TIME]=("201801", "201802", "201803")
  The scope will be 2018 January, 2018 February and 2018 March
MEMBERSET [d/TIME]="201801" TO "201812"
  The scope will be 2018 January to 2018 December
MEMBERSET [d/TIME]=[d/VERSION].[p/BEGINNING] TO [d/VERSION].[p/ENDING]
  If the value of BEGINNING is "201801" and ENDING is "201812", then the scope will be 2018 January to 2018 December
MEMBERSET [d/TIME]="201801"
  ADD_MEMBERSET [d/TIME]=NEXT( )
  The scope will be 2018 January and 2018 February
RESULTLOOKUP([d/TIME]="201801")
  It returns data set of TIME=2018 January
DATA ([d/TIME]="201801")=RESULTLOOKUP( )
  It generates data set in TIME=2018 January According to some embodiments, a "MEMBERSET" type instruction may overwrite a dimension member scope. For example, MEMBERSET [d/DimensionName]=DimensionMemberName, where DimensionName may be required. Note that dimension name or dimension property name ([d/dimension name] or [d/dimension name].[p/dimension property name]) may be a variable value that cannot be placed. Similarly, DimensionMemberName may be required ("dimension member name", ("dimension member name1", "dimension member name2", . . . ), [d/dimension name]. [p/property name]) and a variable value that cannot be placed.

According to some embodiments, a "FILTER_MEMBERSET" type
Instruction may filter dimension member scope. For example, FILTER_MEMBERSET [d/DimensionName] =DimensionMemberName may include parameters DimensionName (required, such as [d/dimension name], [d/dimension name].[p/dimension property name]) and DimensionMemberName (required, such as "dimension member name," ("dimension member name1", "dimension member name2", . . . ), [d/dimension name].[p/property name]).

According to some embodiments, an "ADD_MEMBERSET" type instruction may add dimension member scope. For example, ADD_MEMBERSET [d/DimensionName]= DimensionMemberName may include as parrameters DimensionName (required, [d/dimension name] or [d/dimension name]. [p/dimension property name]) and DimensionMemberName (required, "dimension member name," ("dimension member name1", "dimension member name2", . . . ), [d/dimension name].[p/property name]).

According to some embodiments, a "BASEMEMBER" type function may set the scope to base members. For example, BASEMEMBER (DimensionHierarchyName, DimensionMemberName) may include as parameters:
DimensionHierarchyName
Required. Dimension hierarchy name
[d/ENTITY].[h/H1]

DimensionMemberName
Required. Dimension member name
If DimensionMemberName is base member, it returns itself, DimensionMemberName.
For example: MEMBERSET [d/ENTITY]=BASEMEMBER([d/ENTITY].[h/H1], "World") may return base member of "World" member, like "DE", "FR", "CN", "KR", "US", "BZ".... In the case of multiple members to set the scope to base members, use multiple BASEMEMBER function. MEMBERSET [d/ENTITY]=(BASEMEMBER([d/ENTITY].[h/H1], "EU"), BASEMEMBER([d/ENTITY].[h/H1], "ASIA")). BASEMEMBER can be combined with any other member set. MEMBERSET [d/ENTITY]=(BASEMEMBER([d/ENTITY].[h/H1], "EU"), "KR"). Any duplicate base members resulting from BASEMEMBER will be automatically removed. The following statement exemplifies how this works. Let's assume that PL3100 is a child of PL3000. In this case, retrieving base members of both PL3100 and PL3000 would result in overlapping sets. However, the system only lists a single occurrence of each account. MEMBERSET [d/PRODUCT]=(BASEMEMBER([d/ENTITY].[h/H1], "PL3000"), BASEMEMBER([d/ENTITY].[h/H1], "PL3100")). BASEMEMBER can be used in MEMBERSET and IF when set the member scope. BASEMEMBER in IF condition is not in scope.

According to some embodiments, a "ELIMMEMBER" type function may return the name of the elimination member below the common parent. For example, ELIMMEMBER (ElimDimensionHierarchyName, OrganizationMemberName, IntCoMemberName [, ElimDimensionProperty]) may include the following parameters:
ElimDimensionHierarchyName
Required, it must be in the format [d/<DimensionName>]. [h/<HierarchyName>] OrganizationMemberName
Required. Organization member name
A specific name enclosed in double quotes, such as "DE"
It allows to use member set using dimension name keyword, such as [d/ORG]. At that time, member set under current scope will be selected.
It also allow to use member set using dimension property name keyword, such as [d/INTCO].[p/ORG]. At that time, member set under current scope's property will be selected.
IntCoMemberName
Required. Organization member name
A specific name enclosed in double quotes, such as "DE"
It allows to use member set using dimension name keyword, such as [d/INTCO]. At that time, member set under current scope will be selected.
It also allow to use member set using dimension property name keyword, such as [d/ORG].[p/INTCO]. At that time, member set under current scope's property will be selected.
ElimDimensionProperty
Optionally, this can be used to indicate the name of the ElimOrganizationMemberName's property and value that defines the elimination, (i.e. Elimname dimension member set where the amounts should be eliminated) like [d/ORG].[p/ELIMINATION]="Y"
If omitted the value, [d/<DimensionName>].[p/ELIMINATION]="Y" will be assumed.

According to some embodiments, a "NEXT" type function may return the Nth member after the current one. For example, NEXT ([offset]) may include the optional parameter offset (the number of Nth time member after that can be omitted and the default value is 1). Consider RESULTLOOKUP([d/S_ACCOUNT]="Volume", [d/TIME]=NEXT( )) and RESULTLOOKUP([d/S_ACCOUNT]="Volume", [d/TIME]=NEXT(4)) which returns cell value of (Current TIME scope+4th).

According to some embodiments, a "PREVIOUS" type function may return the Nth member before the current one. For example, PREVIOUS ([offset]) might have offset as an optional parameter (e.g., and will return the number of Nth time member after, if the value is omitted, the default value is 1). When RESULTLOOKUP([d/S_ACCOUNT]="Volume", [d/TIME]=PREVIOUS( )) RESULTLOOKUP([d/S_ACCOUNT]="Volume", [d/TIME]=PREVIOUS(3)), the system returns cell value of (Current TIME scope−3rd).

According to some embodiments, a "FIRST" type function may represent the first period of current year. For example, RESULTLOOKUP([d/S_ACCOUNT]="Volume", [d/TIME]=FIRST( )) will return the cell value of the first month from current year.

According to some embodiments, a "PREYEARLAST" type function may represent the last period of previous year. For example, RESULTLOOKUP([d/S_ACCOUNT]="Volume", [d/TIME]=PREYEARLAST( )) may return the cell value of the last month from the previous year.

According to some embodiments, a "DATA" type instruction may represent a writing value and create records based on the scope. For example, DATA[DimensionFilter1] [,DimensionFilter2] . . . ) may have as parameters an optional DimensionFilters (list of dimension name and member pairs) and multiple dimension set can be contained (note that it doesn't contain a formula member/parent member). Consider:

```
IF [d/S_ACCOUNT]="VOLUME" THEN
    DATA([d/S_ACCOUNT]="PL_SALES",
    [d/AUDIT_TRAIL]="AT_CALC") = RESULTLOOKUP( ) *
    RESULTLOOKUP([d/S_ACCOUNT]="ZPRICE",
    [d/AUDIT_TRAIL]="AT_INPUT",[d/FLOW]="F_NONE")
ENDIF
```

This will generate the data set illustrated in Table 83:

TABLE 83

| ACCOUNT | ENTITY | AUDIT_TRAIL | FLOW | TIME | SIGNEDDATA |
|---|---|---|---|---|---|
| PL_SALES | KR | AT_CALC | F_NONE | 2016 | 852291385.9 |
| PL_SALES | CN | AT_CALC | F_NONE | 2016 | 862029623.7 |
| PL_SALES | KR | AT_CALC | F_NONE | 2017 | 873737247 |

To generate a constant value using DATA( ) all dimension scope must be defined in DATA( ) Otherwise planning script cannot recognize a generated data set scope in which dimension members are using.

According to some embodiments, an "IF ELSEIF" type instruction may conditionally execute a group of statements, depending on the value of an expression and use the syntax:

```
IF condition1 THEN
    [statement1 ...]
[ELSEIF condition2 THEN
    statement2 ...]
END IF
```

The condition1 parameter might be, for example, a Boolean expression (when the value is NULL, it is treated as false). The statement1 parameter is an optional statement to be executed if condition1 is true (can be a compound statement). Similarly, the parameter condition2 may be a Boolean expression and optional statement2 is a statement to be executed if condition2 is true. For example:

```
IF [d/TIME].[p/SFP_FLAG]]="PF" THEN
    IF [d/S_ACCOUNT]="VOLUME" THEN
        DATA([d/S_ACCOUNT]="PL_SALES") = RESULTLOOKUP( ) *
        RESULTLOOKUP([d/S_ACCOUNT]= "ZPRICE")
        DATA([d/S_ACCOUNT]="PL_ZDIRLAB") = RESULTLOOKUP( ) *
        RESULTLOOKUP([d/S_ACCOUNT]="ZDLR")
    ELSEIF [d/S_ACCOUNT]=("ZMATL", "ZODC") THEN
        DATA([d/S_ACCOUNT]="PL_COGS") = RESULTLOOKUP( )
    ENDIF
ELSEIF [d/TIME].[p/SFP_FLAG]]="PL" THEN
    IF [d/S_ACCOUNT]="VOLUME" THEN
        DATA([d/S_ACCOUNT]="PL_SALES", [d/AUDIT_TRAIL]="AT_CALC") =
        RESULTLOOKUP( ) * RESULTLOOKUP([d/S_ACCOUNT]= "ZPRICE")
        DATA([d/S_ACCOUNT]="PL_ZDIRLAB", [d/AUDIT_TRAIL]="AT_CALC") =
        RESULTLOOKUP( ) * RESULTLOOKUP([d/S_ACCOUNT]="ZDLR")
    ELSEIF [d/S_ACCOUNT]=("ZMATL", "ZODC") THEN
        DATA([d/S_ACCOUNT]="PL_COGS", [d/AUDIT_TRAIL]="AT_CALC") =
        RESULTLOOKUP( )
    ENDIF
ENDIF
```

If multiple dimension scope is defined in condition1/condition2, only AND keyword is available in Planning script. Note that an "ELSE" instruction is not available. Moreover, in IF condition parameter, End-user can use only same structure. Note that the following can be used, but cannot be mixed in single IF condition: POV, RESULTLOOKUP, VARIABLE, etc.

According to some embodiments, a "FOREACH" type instruction may repeat a group of statements for each element in a collection. For example:

```
FOREACH [ dimensionName1, dimensionName2 ... ]
    [statement]
ENDFOR
``` may have optional parameters dimensionName1 and dimensionName2. Note that the instruction can be used for multiple dimension names. In this case, dimension scope will be GROUP BY technically. A group of statement under FOREACH will be executed with one of combination of given dimensions. A parameter statement may be repeatedly executed under FOREACH dimension scope. If there is nothing in dimensionName parameter, it repeats a group of statements based on all dimension scope.

According to some embodiments, a "FLOAT" type variable may provide approximate-number data types for use with floating point numeric data. For example, FLOAT fVariable[=<initial value] may have as a parameter/Variable. The default value of Float may be 0.0. Moreover, the variable might not be case-sensitive (that is, FLOAT fCount might be equal to FLOAT FCOUNT).

According to some embodiments, an "INTEGER" type variable may provide exact-number data types that use integer data. For example, INTEGER iVariable may have iVariable as a parameter (e.g., a Boolean expression, when value is NULL it is treated as false). Consider:

```
MEMBERSET [d/TIME]= TO NEXT(12)
INTEGER iCOUNT
IF [d/S_ACCOUT].[p/GROUP] = "DEPRECIATION" THEN
    fOPER_CF = 0
    FOREACH
        iCOUNT = [d/S_ACCOUNT].[p/DEPRE_CNT]
```

-continued

```
    ENDFOR
    IF iCOUNT > 0 THEN
        DATA([d/S ACCOUNT]="Depreciation",
        [d/TIME]=NEXT(iINDEX+1)) =
        RESULTLOOKUP( ) / iCOUNT
    ENDIF
ENDIF
```

The default value of Integer may be 0. Note that an integer variable cannot be assign to DATA directly. Moreover, the variable might not be case-sensitive (that is, INTEGER iCount may be equal to INTEGER ICOUNT).

Figure 23:
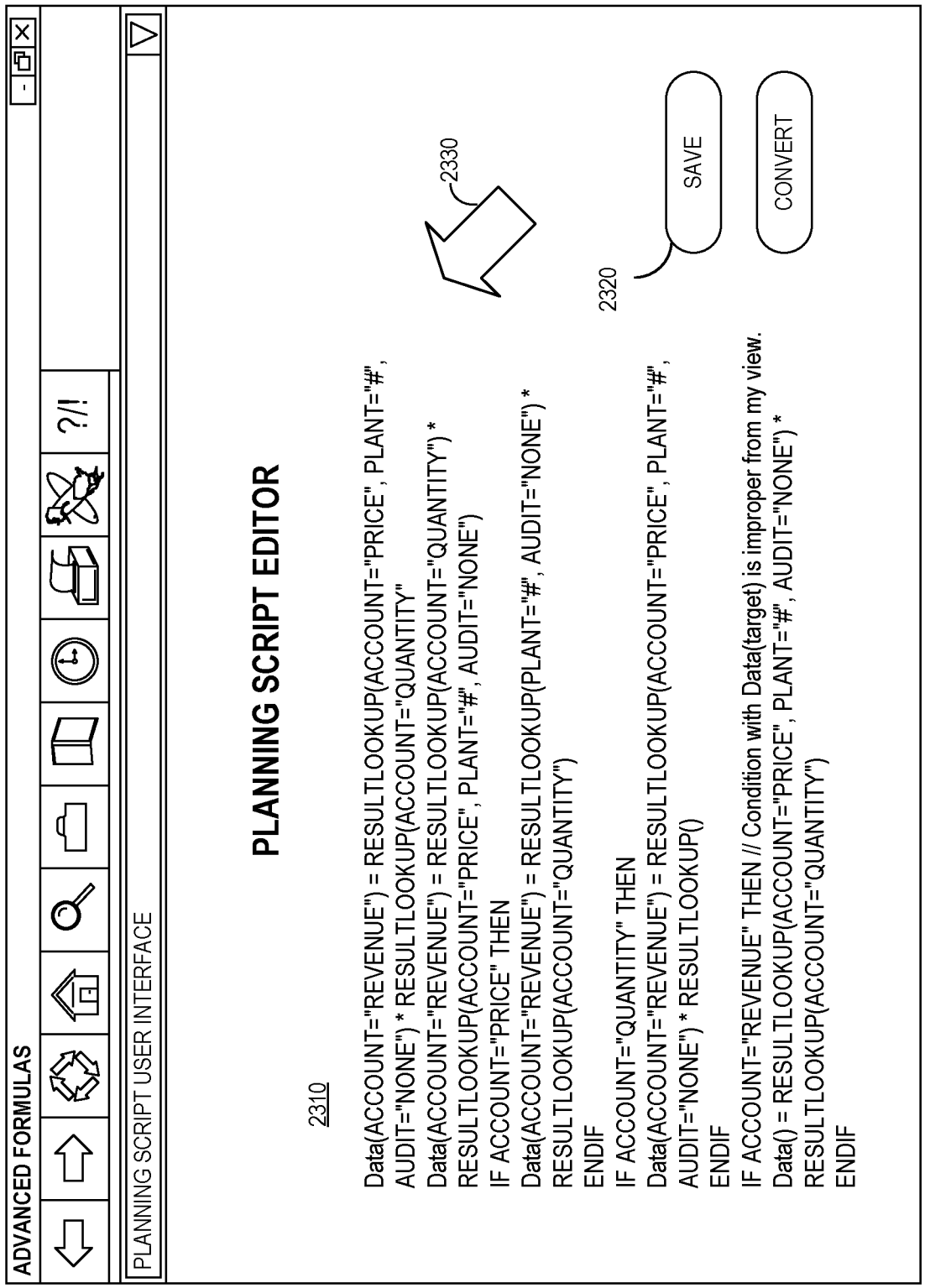
FIG. 23 illustrates an interactive user interface display according to some embodiments.

FIG. 23 illustrates an interactive user interface display 1300 according to some embodiments. The display 2300 includes a data entry area 2310 where a user can enter an advanced formulas planning script. Selection of an element on the display 1300 (e.g., via a computer mouse pointer 2330 or touchscreen) may result in a pop-window providing more information about that element and/or allow a user to adjust parameters associated with that element. Moreover, the display 1300 may include user-selectable icons 2320 to store a planning script, initiate a conversion to SQL procedure, etc.

Thus, embodiments may provide several advantages, such as allowing a user to enter complex queries without needing to know MDX or MDL. Moreover, the system may parse a script to find a way to read existing records in one pass (instead of reading existing records one-by-one).

Figure 24:
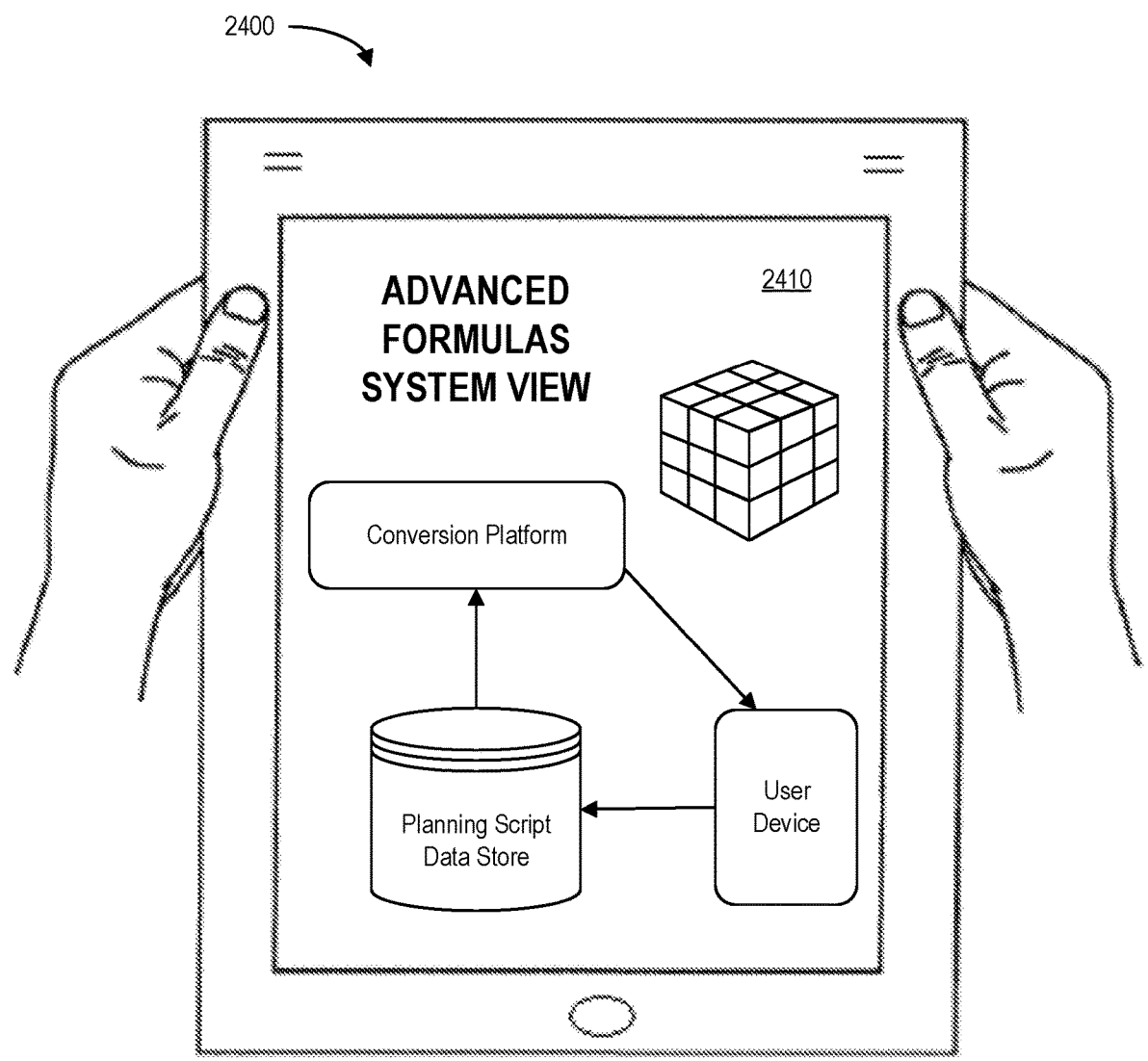
FIG. 24 illustrates a handheld tablet computer in accordance with some embodiments.

The foregoing diagrams represent logical architectures for describing processes according to some embodiments, and actual implementations may include more or different components arranged in other manners. Other topologies may be used in conjunction with other embodiments. Moreover, each system described herein may be implemented by any number of devices in communication via any number of other public and/or private networks. Two or more of such computing devices may be located remote from one another and may communicate with one another via any known manner of network(s) and/or a dedicated connection. Each device may comprise any number of hardware and/or software elements suitable to provide the functions described herein as well as any other functions. For example, any computing device used in an implementation of the discussed architectures may include a processor to execute program code such that the computing device operates as described herein. Moreover, the displays described are provided only as examples and other types of displays might be implemented. For example, FIG. 24 shows a handheld tablet computer 2400 in accordance with some embodiments. A display 2410 might provide a system-level overview of components of a system to let an administrator or operator adjust operation of the system (e.g., by assigning a new analytics data cube to a conversion platform, adding a user device, etc.).

Moreover, validation rules and functions may be provided in accordance with any of the embodiment described herein. For example, syntax validation might look for invalid character or words, missing parameters, too many parameters, invalid types associated with functions and/or return values, missing ENDs associated with IF or FOREACH instructions, duplicate variable names, undefined variable names, semantic problems, etc. Similarly, content validation might generate errors (e.g., when a planning script cannot be executed) and/or warnings (e.g., when a planning script can be executring but unexpected behavior might result). As another example, error handling might provide real-time validation, implement a "validation" button to initiate a review, be performed when a file is saved, etc.

All systems and processes discussed herein may be embodied in program code stored on one or more non-transitory tangible computer-readable media. Such media may include, for example, a floppy disk, a CD-ROM, a DVD-ROM, a Flash drive, magnetic tape, and solid-state RAM or ROM storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system associated with an analytics cloud environment, comprising:
   (a) a user interface to facilitate generation of an advanced formulas planning script by a user, wherein the advance formula planning script includes source and target scope definitions with a partial point of view result lookup parameter, a condition to be applied, and a calculation to generate a calculated data result;
   (b) a planning script data store containing the advanced formulas planning script;
   (c) an analytic data cube containing a multidimensional dataset usable for analysis via queries; and
   (d) a conversion platform, coupled to the planning script data store and the analytic data cube, adapted to:
      (i) receive the advanced formulas planning script,
      (ii) automatically create a structured query language stored procedure based on the advanced formulas planning script, including the source and target scope definitions, the partial point of view result lookup parameter, the condition to be applied, and the calculation to generate the calculated data result,
      (iii) execute the structured query language stored procedure on the analytic data cube to generate the calculated data result comprising a base cell and at least one cell has a different point of view associated with the analytic data cube as compared to a calculation source, and
      (iv) provide the calculated data result to the user,
   wherein the stored procedure is associated with two result lookups, and the conversion platform performs generalized mapping as follows:
      when both result lookups have calculation scope dynamic members: using a JOIN field such that the output is dynamic,
      when one result lookup has a calculation scope dynamic member and the other result lookup has a calculation scope fixed member: using a dynamic field such that the output is dynamic, and
      when both result lookups have calculation scope fixed members: using an EMPTY field such that the output is fixed,
   and further wherein the conversion platform is associated with all of: (i) syntax validation to look for invalid characters and words, (ii) content validation to generate errors when a planning script cannot be executed and warnings when a planning script can be executed but unexpected behavior might result, and (iii) error handling to provide a real-time validation review initiated when a user icon is selected or the advanced formulas planning script is saved.

2. The system of claim 1, wherein the conversion platform includes a scope definition engine to associate a source scope and a target scope with the advanced formulas planning script.

3. The system of claim 2, wherein the conversion platform includes a condition engine to associate various calculations with various conditions for the calculation performed in connection with the advanced formulas planning script.

4. The system of claim 3, wherein the conversion platform includes a calculation engine that internally stores a result of an advanced formulas planning script step to be used by a subsequent advanced formulas planning script step.

5. The system of claim 1, wherein the conversion platform is associated with: (i) a scope and condition function, (ii) a ResultLookup function, (iii) a mathematical calculation function, and (iv) a data generation function.

6. The system of claim 5, wherein the scope and condition function comprises at least one of: (i) a master data filter, and (ii) a cell value filter.

7. The system of claim 5, wherein the data generation function comprises: (i) data generation with ResultLookup, (ii) data generation with a local variable or numeric value, and (iii) calculation scope initialization.

8. The system of claim 1, wherein the conversion platform is associated with at least one of: (i) multiple cell value filters, and (ii) a cell value filter using an attribute.

9. The system of claim 8, wherein the conversion platform is associated with multiple cell value filters having at least one of: (i) a same granularity, (ii) a subset granularity, (iii) partially overwrapped information, and (iv) a comparison of cell values.

10. A computer-implemented method associated with an analytics cloud environment, comprising:
    facilitating, via a user interface, generation of an advanced formulas planning script by a user, wherein the advance formula planning script includes source and target scope definitions with a partial point of view result lookup parameter, a condition to be applied, at least one loop instruction, and a calculation to generate a calculated data result;
    storing the advanced formulas planning script in a planning script data store;
    retrieving, by a conversion platform, the advanced formulas planning script from the planning script data store, including the source and target scope definitions, the partial point of view result lookup parameter, the condition to be applied, the at least one loop instruction, and the calculation to generate the calculated data result;

automatically creating, by the conversion platform, a structured query language stored procedure based on the advanced formulas planning script;

executing the structured query language stored procedure on an analytic data cube, containing a multidimensional dataset usable for analysis via queries, to generate the calculated data result comprising a base cell and at least one cell has a different point of view associated with the analytic data cube as compared to a calculation source, wherein the at least one loop instruction causes iterative execution of instructions, each iteration having multiple dimensions and members; and providing the calculated result to the user, wherein the stored procedure is associated with two result lookups, and the conversion platform performs generalized mapping as follows:

when both result lookups have calculation scope dynamic members: using a JOIN field such that the output is dynamic, when one result lookup has a calculation scope dynamic member and the other result lookup has a calculation scope fixed member: using a dynamic field such that the output is dynamic, and when both result lookups have calculation scope fixed members: using an EMPTY field such that the output is fixed, and further wherein the conversion platform is associated with all of: (i) syntax validation to look for invalid characters and words, (ii) content validation to generate errors when a planning script cannot be executed and warnings when a planning script can be executed but unexpected behavior might result, and (iii) error handling to provide a real-time validation review initiated when a user icon is selected or the advanced formulas planning script is saved.

11. The method of claim 10, wherein the conversion platform includes a scope definition engine to associate a source scope and a target scope with the advanced formulas planning script.

12. The method of claim 11, wherein the conversion platform includes a condition engine to associate various calculations with various conditions for the calculation performed in connection with the advanced formulas planning script.

13. The method of claim 12, wherein the conversion platform includes a calculation engine that internally stores a result of an advanced formulas planning script step to be used in a subsequent advanced formulas planning script step.

14. The method of claim 10, wherein the conversion platform is associated with: (i) a scope and condition function, (ii) a ResultLookup function, (iii) a mathematical calculation function, and (iv) a data generation function.

15. The method of claim 14, wherein the scope and condition function comprises at least one of: (i) a master data filter, and (ii) a cell value filter.

16. The method of claim 14, wherein the data generation function comprises: (i) data generation with ResultLookup, (ii) data generation with a local variable or numeric value, and (iii) calculation scope initialization.

17. A non-transitory, computer-readable medium storing program code, the program code executable by a computer processor to cause the processor to perform a method associated with an analytics cloud environment, the method comprising:

facilitating, via a user interface, generation of an advanced formulas planning script by a user, wherein the advance formula planning script includes source and target scope definitions with a partial point of view result lookup parameter, a condition to be applied, and a calculation to generate a calculated data result;

storing the advanced formulas planning script in a planning script data store;

retrieving, by a conversion platform, the advanced formulas planning script from the planning script data store, including the source and target scope definitions, the partial point of view result lookup parameter, the condition to be applied, and the calculation to generate the calculated data result;

automatically creating, by the conversion platform, a structured query language stored procedure based on the advanced formulas planning script;

executing the structured query language stored procedure on an analytic data cube, containing a multidimensional dataset usable for analysis via queries, to generate the calculated data result comprising a base cell and at least one cell has a different point of view associated with the analytic data cube as compared to a calculation source; and providing the calculated result to the user, wherein the stored procedure is associated with two result lookups, and the conversion platform performs generalized mapping as follows:

when both result lookups have calculation scope dynamic members: using a JOIN field such that the output is dynamic, when one result lookup has a calculation scope dynamic member and the other result lookup has a calculation scope fixed member: using a dynamic field such that the output is dynamic, and when both result lookups have calculation scope fixed members: using an EMPTY field such that the output is fixed, and further wherein the conversion platform is associated with all of: (i) syntax validation to look for invalid characters and words, (ii) content validation to generate errors when a planning script cannot be executed and warnings when a planning script can be executed but unexpected behavior might result, and (iii) error handling to provide a real-time validation review initiated when a user icon is selected or the advanced formulas planning script is saved.

18. The medium of claim 17, wherein the conversion platform is associated with at least one of: (i) multiple cell value filters, and (ii) a cell value filter using an attribute.

19. The medium of claim 18, wherein the conversion platform is associated with multiple cell value filters having at least one of: (i) the same granularity, (ii) a subset granularity, (iii) partially overwrapped information, and (iv) a comparison of cell values.

* * * * *